(12) United States Patent
Nogales et al.

(10) Patent No.: US 10,150,574 B2
(45) Date of Patent: Dec. 11, 2018

(54) LANDING GEAR LIGHTS HAVING MULTI-AXIS ROTATION

(71) Applicant: The Boeing Company, Chicago, IL (US)

(72) Inventors: Frank Nogales, Everett, WA (US); Khiem Nguyen Pham, Everett, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 14/806,393

(22) Filed: Jul. 22, 2015

(65) Prior Publication Data
US 2017/0021940 A1 Jan. 26, 2017

(51) Int. Cl.
*B62D 47/02* (2006.01)
*B64D 47/04* (2006.01)

(52) U.S. Cl.
CPC .................. *B64D 47/04* (2013.01)

(58) Field of Classification Search
CPC ......... B67D 47/02; B67D 47/04; B67D 47/06
USPC ....................................................... 362/240
See application file for complete search history.

(56) References Cited

U.S. PATENT DOCUMENTS

| | | | |
|---|---|---|---|
| 5,355,131 A | 10/1994 | Metz et al. | |
| 5,580,148 A * | 12/1996 | Liao | B60Q 1/115 362/35 |
| 5,806,956 A * | 9/1998 | Hyun-Jo | B60Q 1/245 362/272 |
| 6,533,441 B2 | 3/2003 | Kisiel | |
| 7,080,928 B2 * | 7/2006 | Barnhart | B64D 47/04 315/82 |
| 2008/0309916 A1* | 12/2008 | Mok | F41G 1/473 356/5.01 |
| 2014/0293628 A1* | 10/2014 | Otsuji | B62J 6/02 362/475 |

OTHER PUBLICATIONS

Defense Industry Daily web page.*
Target web page.*
Xevision, "XeVision™ HID Xenon Aircraft lighting kits," [http://www.xevision.com/hid_aircraft_kits.html], retrieved on Jul. 22, 2015, 7 pages.
Siddarth Bhandary, [https://c1.staticflickr.com/5/4018/4705369949_f934a73e81_b.jpg], retrieved on Jul. 22, 2015, 1 page.
(Continued)

*Primary Examiner* — Evan Dzierzynski
*Assistant Examiner* — Keith G Delahoussaye
(74) *Attorney, Agent, or Firm* — Hanley, Flight and Zimmerman, LLC

(57) ABSTRACT

Landing gear lights having multiple degrees of rotation are described herein. One disclosed example apparatus includes an aircraft landing gear light fixture having a first spherical portion, and a light assembly coupled to the light fixture, where the light assembly includes a second spherical portion adjacent the first spherical portion. The disclosed example apparatus also includes first and second pivots to allow the light assembly to rotate relative to the light fixture about two axes, where the rotation of the light assembly relative to the light fixture occurs by the first and second spherical portions moving relative to one another.

20 Claims, 18 Drawing Sheets

(56) References Cited

OTHER PUBLICATIONS

GE Lighting, "24799-4553 GE PAR46—Aircraft," Product Catalog, [http://www.bulbdirect.com/img/product/description/GE%20Par%20Bulbs/4553-GE.pdf], retrieved on Jul. 22, 2015. 1 page.
Joe Yoon, "Aircraft Lights & Beacons," Feb. 26, 2006, [http://www.aerospaceweb.org/question/electronics/q0263.shtml], retrieved on Jul. 22, 2015, 4 pages.

* cited by examiner

LANDING GEAR LIGHTS HAVING MULTI-AXIS ROTATION

FIELD OF THE DISCLOSURE

This patent relates generally to landing gear lights and, more particularly, to landing gear lights having multi-axis rotation.

BACKGROUND

Landing gear lights are typically used to illuminate a runway for an aircraft during takeoffs or landings during the night or low light conditions. Typical landing gear lights include landing lights and taxiing lights, both of which provide different types of illumination (e.g., different angles and/or amounts of illumination). The landing lights are often oriented from a centerline of the aircraft at a different angle than the taxiing lights to provide a different illumination.

Typically, the degree and/or effectiveness of illumination (e.g., illumination provided to facilitate pilot viewing) from the lights varies significantly based on orientation/alignment of the lights relative to the aircraft. These lights are often designed to illuminate at a distance several feet away from the landing gear lights and, thus, a slight angular alignment error may be magnified at these significant distances. Typical landing gear light alignment systems/methods for the lights provide a limited range to orient/re-orient the lights. Additionally, the orientation of these lights is often accomplished through the use of shims, which may involve difficulty and/or excessive time to align the lights due to interplay between multiple shims and/or design/sizing of the shims necessary to properly align the lights.

SUMMARY

One example apparatus includes an aircraft landing gear light fixture having a first spherical portion, and a light assembly coupled to the light fixture, where the light assembly includes a second spherical portion adjacent the first spherical portion. The example apparatus also includes first and second pivots to allow the light assembly to rotate relative to the light fixture about two axes, where the rotation of the light assembly relative to the light fixture occurs by the first and second spherical portions moving relative to one another.

Another example apparatus includes a light fixture having a first spherical portion, a light assembly having a second spherical portion, where the first and second spherical portions define an interface to allow the light assembly to rotate relative to the landing gear light fixture. The example apparatus also includes a first pivot to allow the light assembly to rotate about a first axis, and a second pivot to allow the light assembly to rotate about a second axis. The example apparatus also includes a slot on the light fixture or the light assembly to guide a pin to affect motion of the light assembly relative to the light fixture.

An example method includes positioning a light alignment indicator within a housing of a light assembly that is assembled to a light fixture, where the housing includes a first spherical portion and the light fixture includes a second spherical portion. The first and second spherical portions define a rotational interface between the housing and the light fixture. The example method also includes rotating the housing relative to the light fixture and about an axis so that a light beam from the light indicator is aligned with a target, and constraining the light assembly relative to the light fixture when the light beam is aligned with the target.

Figure 1:
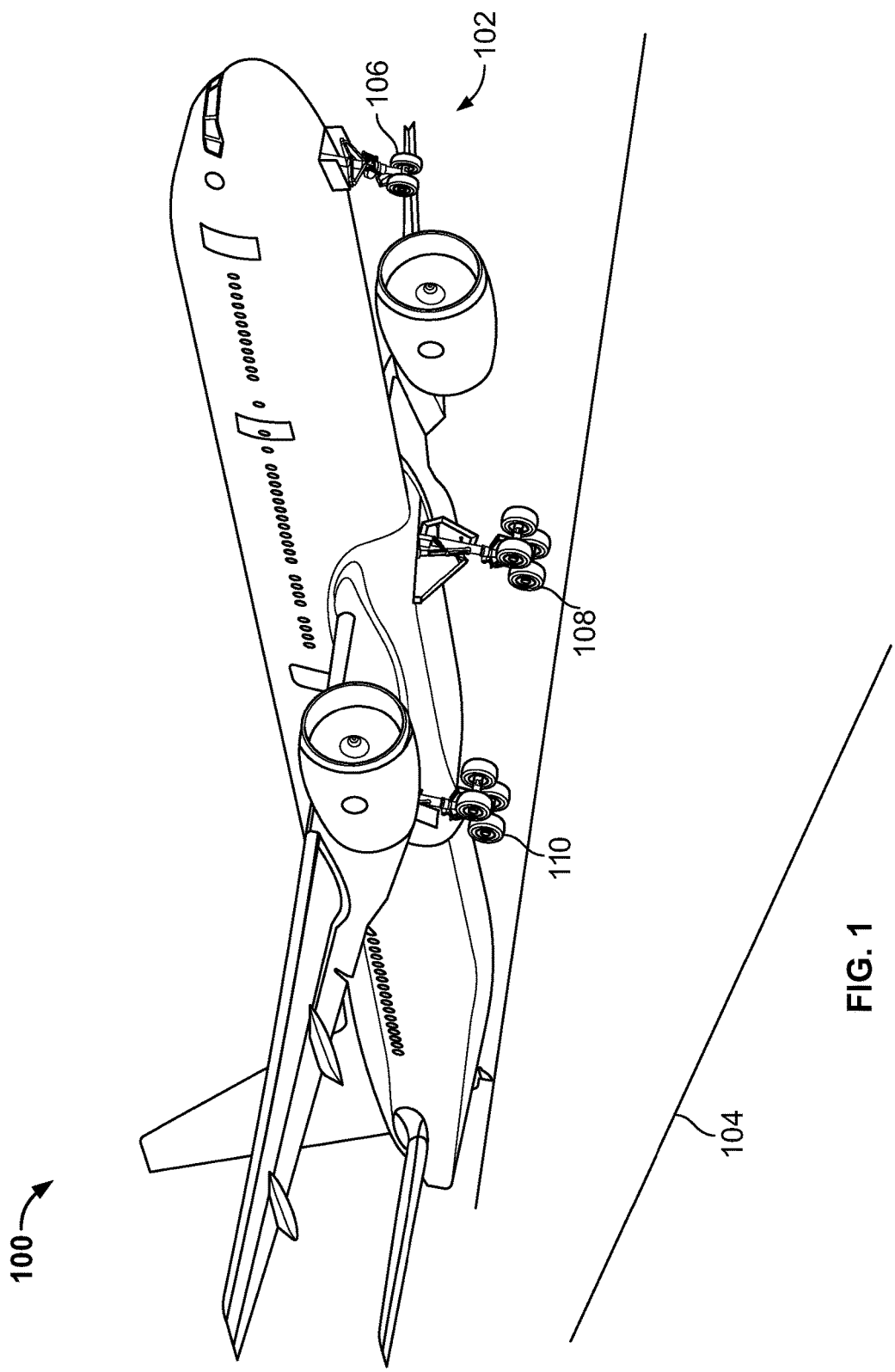
FIG. 1 is an example aircraft in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Landing gear lights (e.g., nose landing gear lights) having multi-axis rotation are disclosed herein. The effectiveness (e.g., illumination effectiveness) of aircraft landing gear lights may often vary based on how the landing gear lights are oriented. In particular, landing lights and taxiing lights of the landing gear lights illuminate at different angles, distances and/or degrees of illumination from the aircraft and, thus, rotational orientation of these lights defines how areas (e.g., areas in front of the aircraft) are illuminated. Relatively small angular errors in the alignment of these lights may result in inadequate illumination because of the relatively far distances of objects and/or surfaces that are to be illuminated by lights on the aircraft. Typical landing gear lights are often oriented/aligned by shims, which may require special manufacturing techniques and/or design, thereby resulting in laborious and/or time-consuming efforts for an operator to shim the lights for proper orientation. In particular, use of shims may require multiple adjustments, multiple shims and/or non-independent adjustments of the shims (e.g., replacing or adjusting one shim may significantly affect alignment/orientation of another shim potentially rendering a previously installed shim ineffective).

The examples disclosed herein allow independent rotational control of at least two rotational axes that result in efficient and significantly less time-consuming alignment procedures, thereby potentially reducing manufacturing costs and/or time. The examples disclosed herein may be used as "drop-in" replacements/upgrades/add-ons of existing lights/light systems on existing landing gear systems to maintain alignment and/or allow ease of alignment during such upgrade/replacement processes. The examples disclosed herein utilize a light (e.g., a light assembly) with a first spherical surface to rotate relative to a second spherical surface of a mounting arm (e.g., a fixture, a light fixture, a mounting fixture, etc.), thereby defining a spherical interface that allows rotational movements of the light relative to the mounting arm. The examples disclosed herein also utilize locking systems (e.g., a lock, locking features, locking devices, set screws, screws that are torqued to engage retainers) to constrain (e.g., lock, reduce a range of motion) rotational movement for each rotational degree of freedom once the light has been properly aligned. In some examples, multiple spherical interfaces are defined between the mounting arm and the light to allow rotational displacement(s) in multiple axes of the light in relationship to the mounting arm. In some examples, the light and/or mounting arm is coupled to a mounting bracket/housing that has openings and/or flange sections to enable accessibility to adjustment and/or locking features corresponding to one or more spherical interfaces between the mounting arm and the light.

In some examples, infrared (IR) lights and/or IR light assemblies, for example, may replace and/or be added to existing landing gear lights for different applications/uses. For example, a commercial aircraft may be converted to other uses (e.g., military) by adding infrared light assemblies (e.g., infrared light assembly housings) to existing landing gear lights (e.g., landing lights/landing mode lights) of a landing gear system of the commercial aircraft. In particular, an add-on IR assembly, which has its own IR landing and taxiing lights that mimic operation of existing landing and taxiing lights, may be added to augment an existing landing gear light system. The examples disclosed herein allow ease of assembly and/or alignment of the replacement lights of such add-on assemblies. In some examples, converting to the other application/use still via an add-on, for example, maintains the functionality (e.g., alignment, illumination angle) of an existing light (i.e., a light to be replaced). In some examples, add-on lights do not cover and/or hinder operation of the existing lights.

FIG. 1 illustrates an example aircraft 100 in which the examples disclosed herein may be implemented. In the illustrated example, the aircraft 100 includes a landing system 102 to support the aircraft 100 on a surface 104 (e.g., a runway) and enable the aircraft 100 to taxi, take off, land, etc. The example landing system 102 includes a front landing gear unit 106 and two rear landing gear units 108 and 110. However, the above-noted numbers of front and rear landing gear units are merely examples and, thus, other examples may employ other numbers of front landing gear units and/or rear landing gear units without departing from the scope of this disclosure.

During takeoff and landing in low light scenarios (e.g., night, cloudy and/or generally unfavorable weather conditions), the example aircraft 100 may require lighting for taxiing from a departure gate to a runway, landing, taxiing from a runway to an arrival gate, and parking. During a given time period (e.g., one day), the example aircraft 100 may require varying illumination levels and/or directions at numerous stages of flight. In particular, the aircraft 100 may require illumination at different positions and/or angles depending on a state of the aircraft and/or conditions external to the aircraft.

Figure 2:
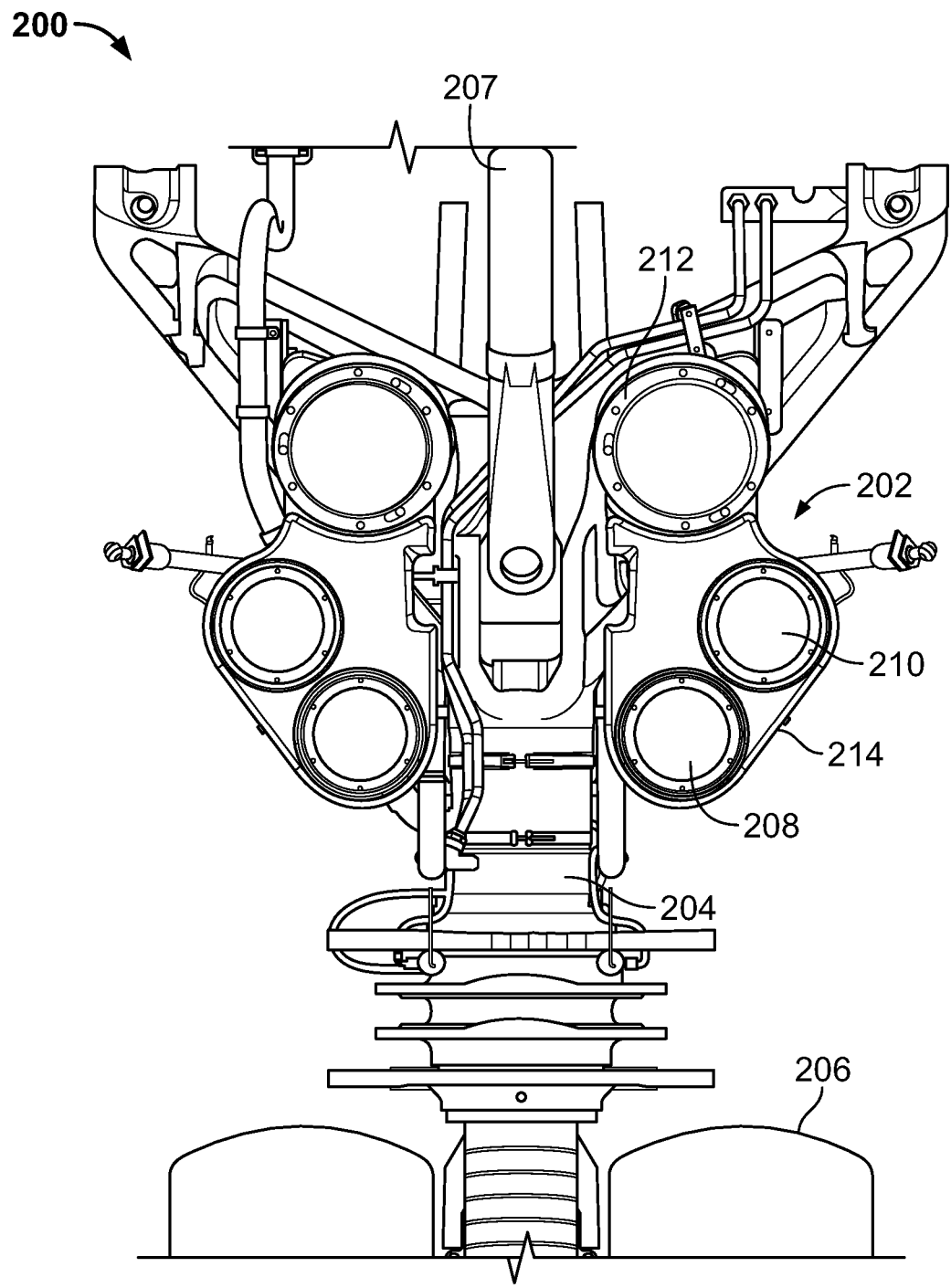
FIG. 2 is an example landing gear system in accordance with the teachings of this disclosure that may be implemented in the example aircraft of FIG. 1.

FIG. 2 is an example landing gear system 200 in accordance with the teachings of this disclosure that may be implemented in the example aircraft 100 of FIG. 1. The example landing gear system 200 includes a light array (e.g., a light assembly) 202, which is mounted to a strut 204, tires 206, and a movable strut support 207. The example light array 202 includes a taxiing light (e.g., an infrared (IR) taxiing light) 208, a first landing light (e.g., an IR landing light, a light assembly) 210 and a second landing light 212, all of which are mounted to a mounting bracket 214. In this example, the mounting bracket 214 is mounted to the strut 204 and has sufficient clearances to avoid other moving parts as the landing gear system 200 is deployed or moved to a closed state. In some examples, the light array 202 is added to existing lights to enable an additional mode of illumination. For example, the light array 202 may be added to an aircraft to mimic operation of the existing lights. In particular, landing gear doors may block the landing light 210 while the landing gear doors do not block the IR taxiing light 208, for example.

Figure 3A:
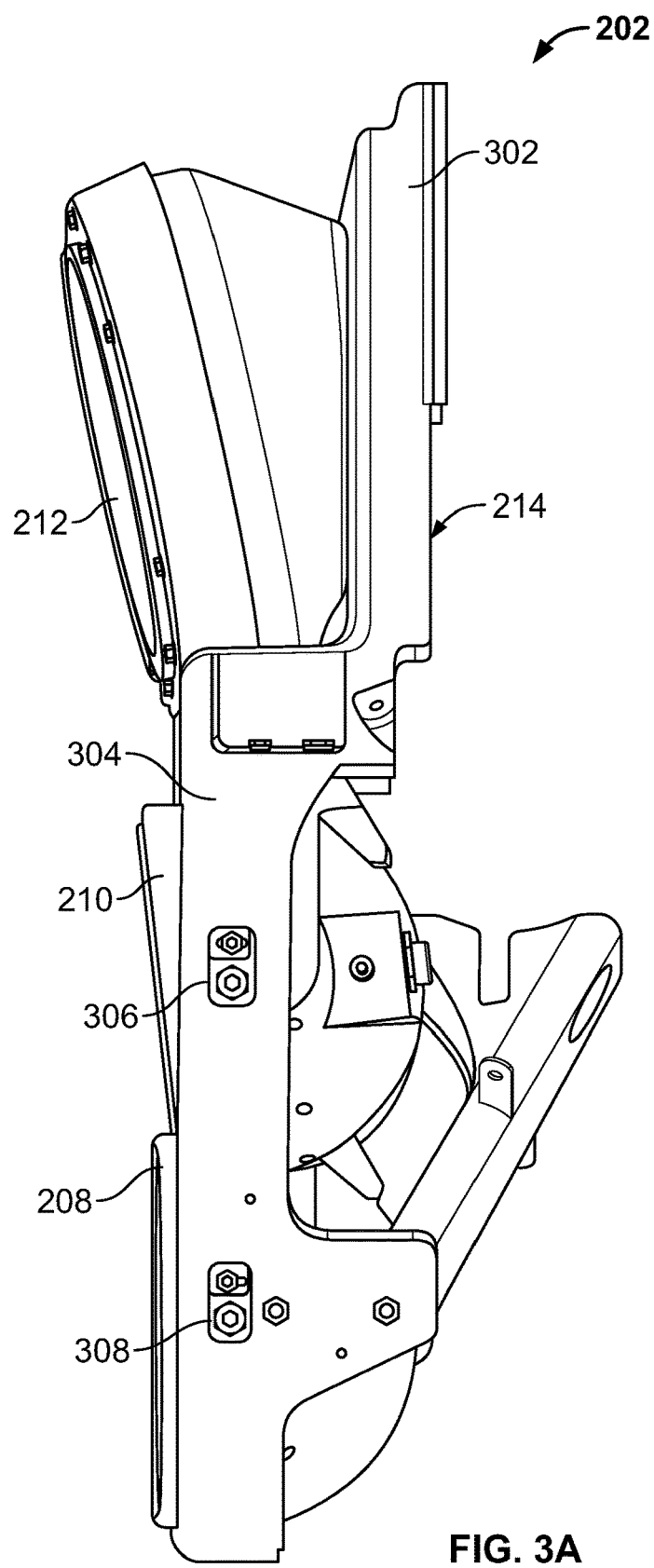
FIG. 3A is a side view of an example light array of FIG. 2.

FIG. 3A is a side view of the example light array 202 of FIG. 2. In this example, the mounting bracket 214 has a first portion 302 and a second portion 304, both of which are angled relative to one another. As can be seen in the view of FIG. 3A, the lights 208, 210, 212 are angled at different vertical angles relative to the mounting bracket 214. In accordance with the teachings of this disclosure, these vertical angles may be adjusted to meet the illumination requirements for the aircraft 100 at different stages (e.g., taxiing, landing, etc.). To facilitate the adjustment of these angles for the lights 208, 210, the second portion 304 of the mounting bracket 214 includes openings 306 and 308 to allow access to adjustment components. The adjustment of the vertical angles of the lights 208, 210 will be described in greater detail below in connection with FIGS. 4, 6A-6B.

Figure 3C:
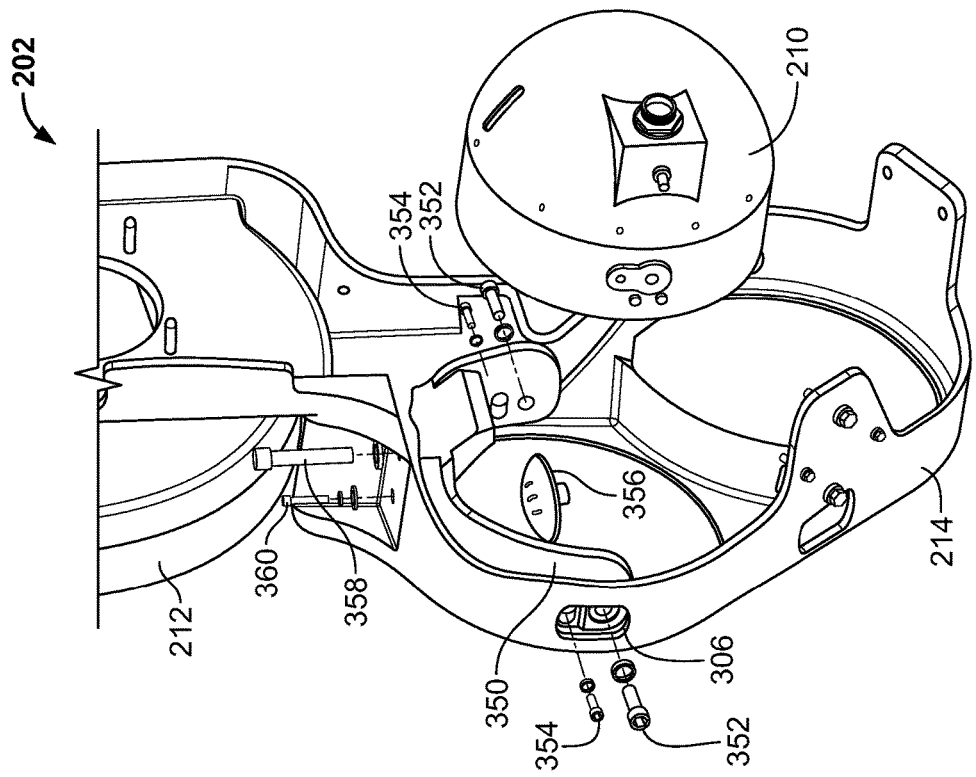
FIG. 3C is an exploded view of the example light array of FIG. 2.
Figure 3B:
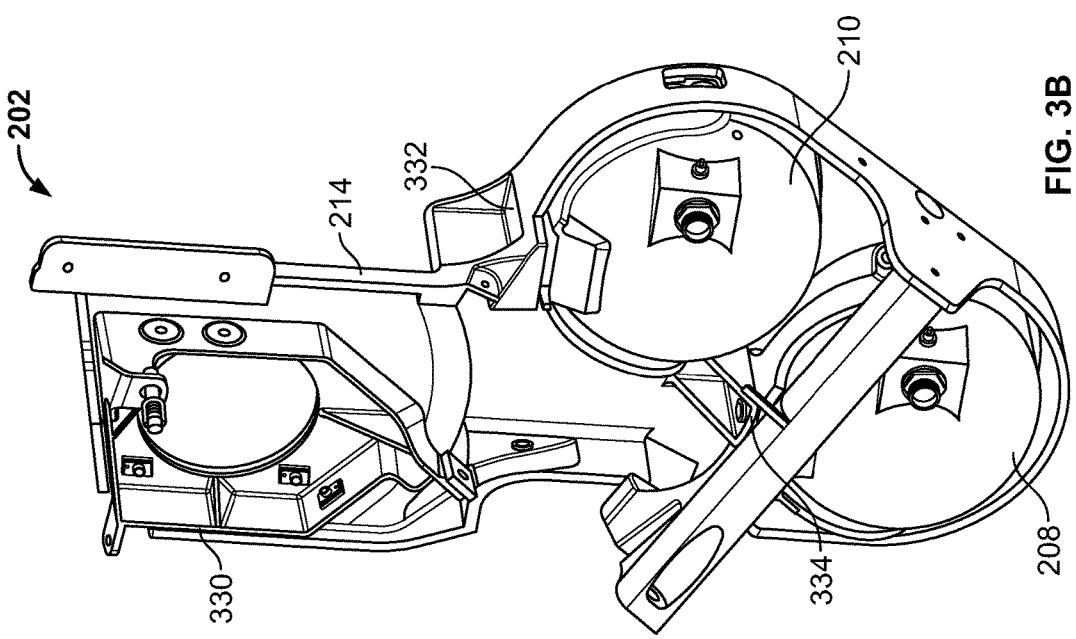
FIG. 3B is a rear quarter view of the example light array of FIG. 2.

FIG. 3B is a rear quarter view of the example light array 202 of FIG. 2 with the second landing light 212 removed. The example light array 202 includes an internal mounting bracket 330 as well as horizontal angle adjustment areas 332, 334 of the mounting bracket 214 to facilitate horizontal angle adjustment of the lights 208, 210. The adjustment of the horizontal angles of the lights 208, 210 will be described in greater detail below in connection with FIGS. 4 and 7.

FIG. 3C is an exploded view of the example light array 202 of FIG. 2. In the view of FIG. 3C, the light 210 is separated from a mounting arm (e.g., a pivot arm, a fixture, a light fixture, etc.) 350 and the light 210 is coupled to the pivot arm 350 by pivot fasteners 352, which allow the light 210 to rotate in a vertical direction, and locking fasteners (e.g., locks, set screws, pins) 354. In this example, a clamp (e.g., a c-shaped clamp, a clamp with a retainer, etc.) 356 is shown separated from the light 210. However, in an assembled state, the clamp 356 is positioned within the light 210 to threadably engage a pivot screw (e.g., a pin) 358, which allows the light 210 to rotate in a horizontal direction. In this example, the pivot screw 358 passes through an aperture of the pivot arm 350 to engage the clamp 356 within the light 210. In this example, tightening the pivot screw 358 increases the retention force of the clamp 356. A locking screw (e.g., a lock, a set screw) 360 prevents the light 210 from rotating horizontally once the locking screw 360 is engaged (e.g., once it has been torqued down). While a locking screw is shown in the example of FIG. 3C, any appropriate locking/fastening system may be used. In some examples, during a conversion process (e.g., commercial to military), the light 210 is replaced by another light (e.g., an IR light during a military use conversion) having similar mounting and/or alignment (e.g., the same mounting and/or alignment features). In other words, the light 210 may be interchangeable with other lights for different applications, for example. In some examples, the light array 202 is added as an upgrade or an add-on to an existing light system to enable different types of functionality. For example, the light array 202 may be assembled to cover an existing light system.

The pivot screw 358 and the locking screw 360 of the illustrated example are sufficiently offset from the light 210 and/or other components so that they can be easily accessed for later adjustments and/or ease of adjustment. In this example, the fasteners 352, 354 are accessible via the opening 306, which allows for adjustment/access of the fasteners 352, 354 on at least one side of the mounting bracket 214.

Figure 4:
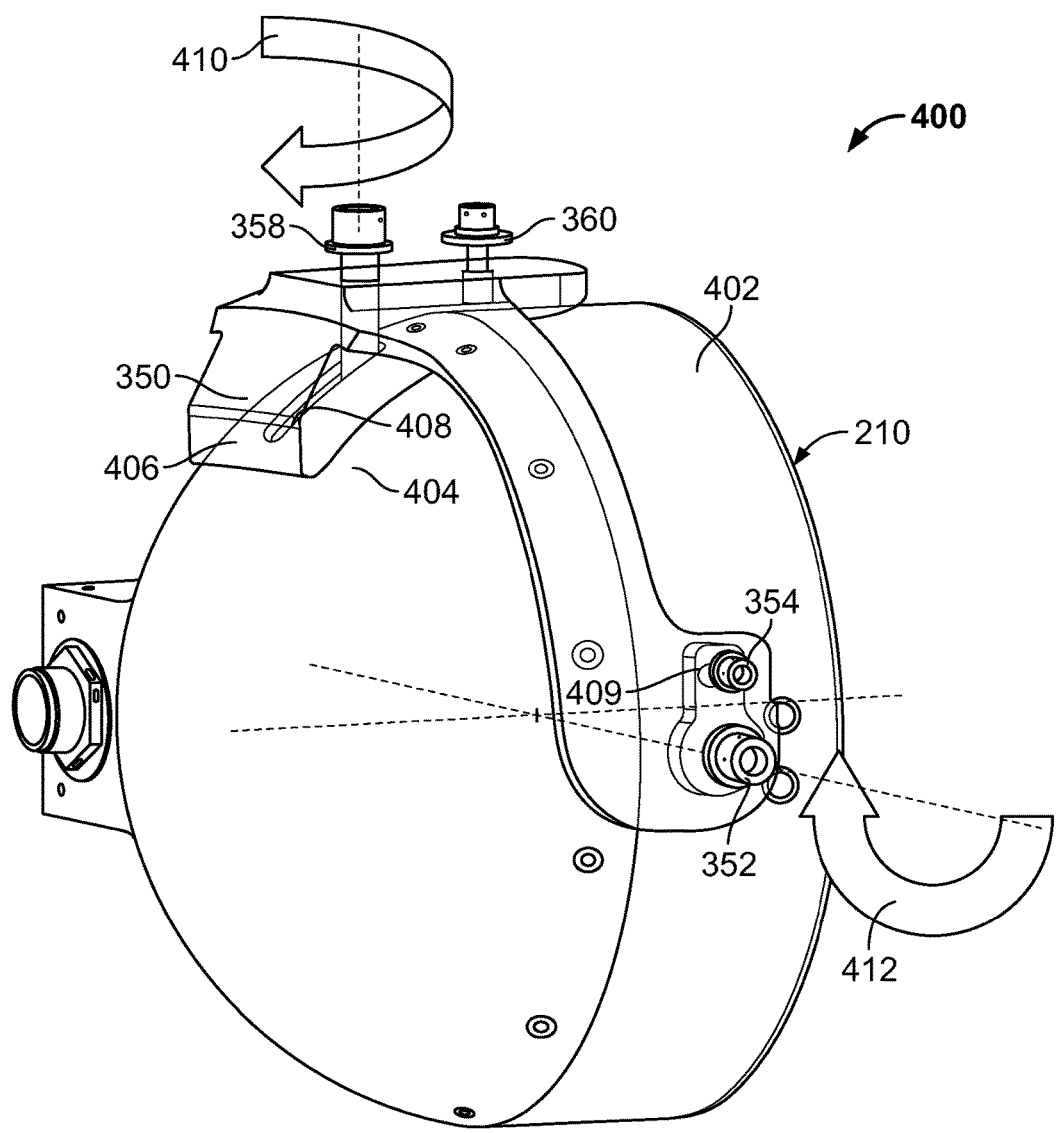
FIG. 4 illustrates an example adjustable alignment portion of the example light array of FIG. 2.

FIG. 4 illustrates an example adjustable alignment portion 400 of the example light array 202 of FIG. 2. The example adjustable alignment portion 400 includes the light 210, the mounting arm 350, the pivot fastener 352, the vertical rotation lock/locking fastener 354, the pivot fastener 358 and the horizontal rotation lock/locking fastener 360. In this example, the light 210 includes a cylindrical portion 402 and a first spherical portion 404. The mounting arm 350 of the illustrated example includes a second spherical portion 406. In this example, the first spherical portion 404 includes a slot (e.g., a linear slot) 408. The example mounting arm 350 also includes an arc-shaped slot 409.

In operation, the relationship (e.g., contact, clearance, etc.) between the first and second spherical portions 404, 406 allows the light 210 to rotate relative to the mounting arm in multiple axial rotation directions defined by different pivot axes. For a first axis rotation/horizontal rotation, which is generally indicated by an arrow 410, the pivot fastener 358 allows the light 210 to rotate about a central axis defined by the pivot fastener 358 until the light 210 is properly oriented in a horizontal direction and can be constrained (e.g., locked) in the horizontal rotational direction by the locking fastener 360. For a second axis rotation/vertical rotations, the slot 409 affects (e.g., constrains, guides, etc.) motion of the locking fastener 354 to allow the light 210 to rotate about the pivot fastener 352 when the light 210 is rotated in a vertical direction, as generally indicated by an arrow 412 until the light 210 is properly oriented in a vertical direction and can be constrained (e.g., locked) into its vertical direction via the locking fastener 354. The examples disclosed herein allow multiple rotational degrees of freedom along with at least one locking mechanism to constrain the light 210 once it is properly aligned. While the example described is a sequential process, both horizontal and vertical directions may be constrained (e.g., locked) in the same step. In other examples, a sequence of constraining the locking fasteners 354, 360 may be in any appropriate order (e.g., alternating) based on ease of manufacturing, for example. In this example, the light 210 can rotate about two axes. However, in other examples, the light 210 may rotate about any other appropriate number of axes (e.g., including a central axis of the light 210).

Figure 5:
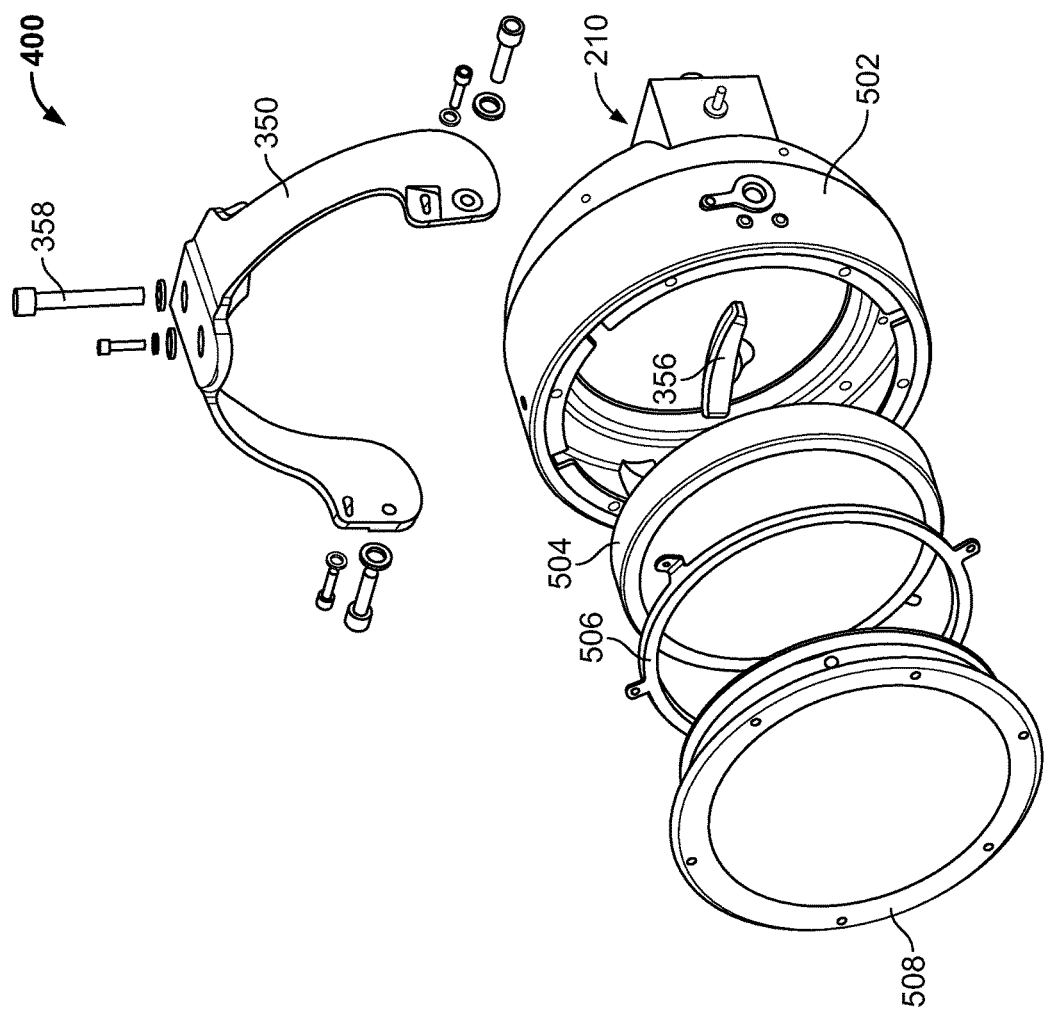
FIG. 5 is an exploded view of the example adjustable alignment portion of FIG. 4.

FIG. 5 is an exploded view of the example adjustable alignment portion 400 of FIG. 4. In the view of FIG. 5, the mounting arm 350 is separated from the light 210. The light 210 of the illustrated example includes a light housing 502, a lamp 504, a retainer ring 506 and a filter (e.g., an IR filter) 508. In this example, the clamp 356 is positioned within the light housing 502 to engage the pivot fastener 358. In some examples, one or more internal components (e.g., the lamp 504 and associated wiring) within the housing 502 are exchanged with other internal components (e.g., an infrared light and associated components/wiring) while maintaining the alignment of the light housing 502 relative to the mounting arm 350 to allow a relatively simple use conversion (e.g., conventional to infrared) for light sources disposed within the light housing 502.

Figure 6A:
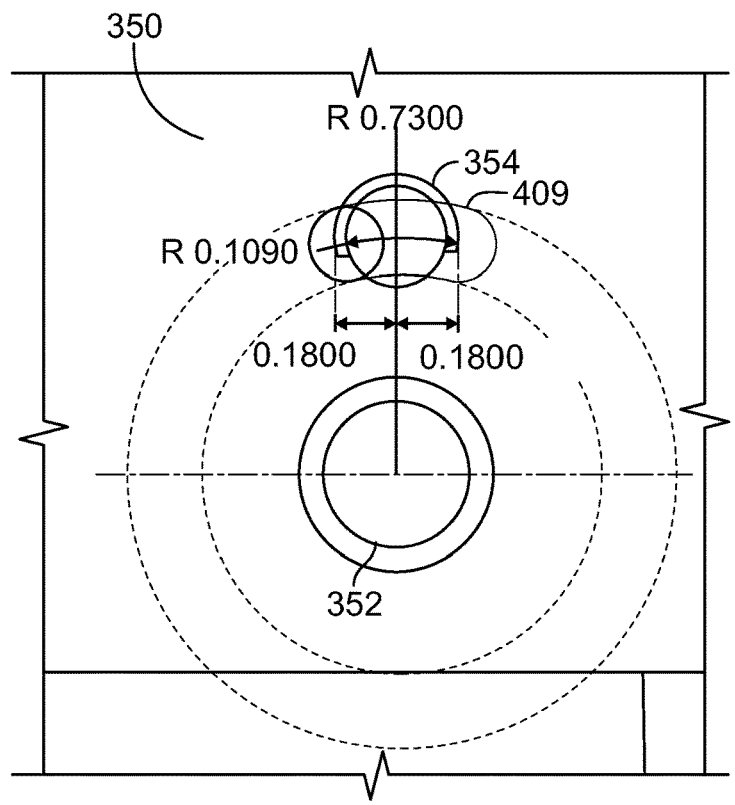
FIGS. 6A and 6B illustrate vertical adjustment features of the example adjustable alignment portion of FIG. 4.
Figure 6B:
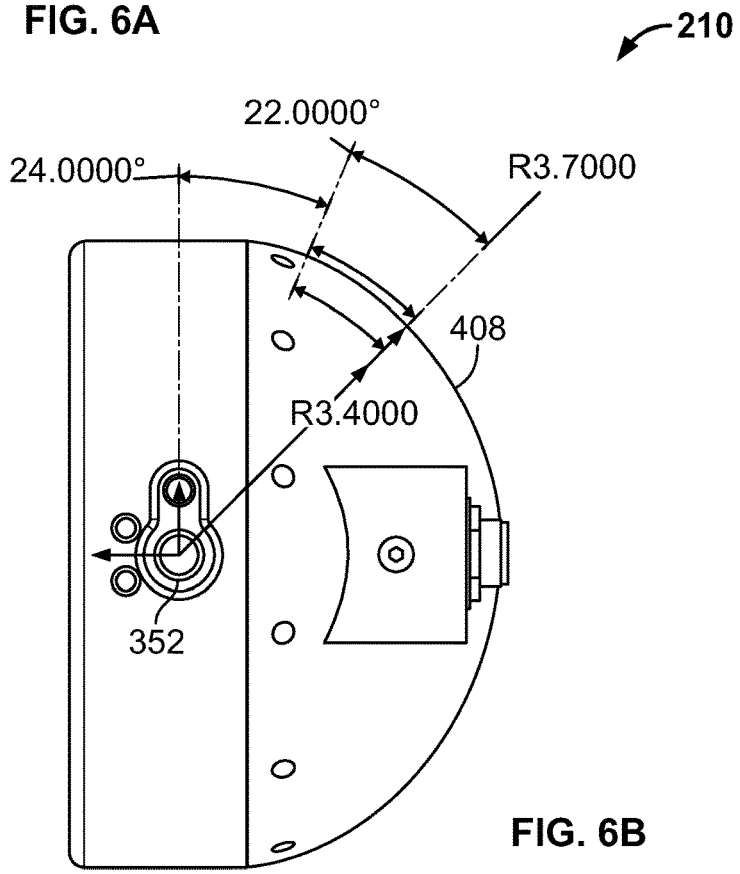

FIGS. 6A and 6B illustrate example vertical adjustment features/geometries of the example adjustable alignment portion 400 of FIG. 4. FIG. 6A illustrates example dimensions (in inches) that may be used to implement the arc-shaped slot 409, which is located on the mounting arm 350, in this example, and allows the locking fastener 354 to rotate about the pivot fastener 352. The dimensions shown are only examples, and any appropriate dimensions and/or geometric arrangements may be used. While the slot 409 of the illustrated example is arc-shaped, the slot 409 may be any other appropriate shape including, but not limited to, a polygon, a rectangle, a trapezoid, a semi-circular shape, an elliptical shape, a parabolic shape, etc. In some examples, the slot 409 may be asymmetric with respect to a centerline defined by the locking fastener 354 and/or a centerline defined by the pivot fastener 352.

FIG. 6B is a detailed view of vertical rotation locking features of the example rotatable light 210 of FIG. 2. The view of 6B illustrates example dimensions, which include a slot dimension of 22 degrees (°) of the slot 408, for which the pivot fastener 358 has a corresponding 12° range of motion in a vertical direction for the light 210. While a 12° angle range of motion (e.g., 6° in opposite directions from a center of the 22° slot 408) is described in the illustrated example, any appropriate angle/dimensions may be used based on application, desired illumination characteristics and/or aircraft design.

Figure 7:
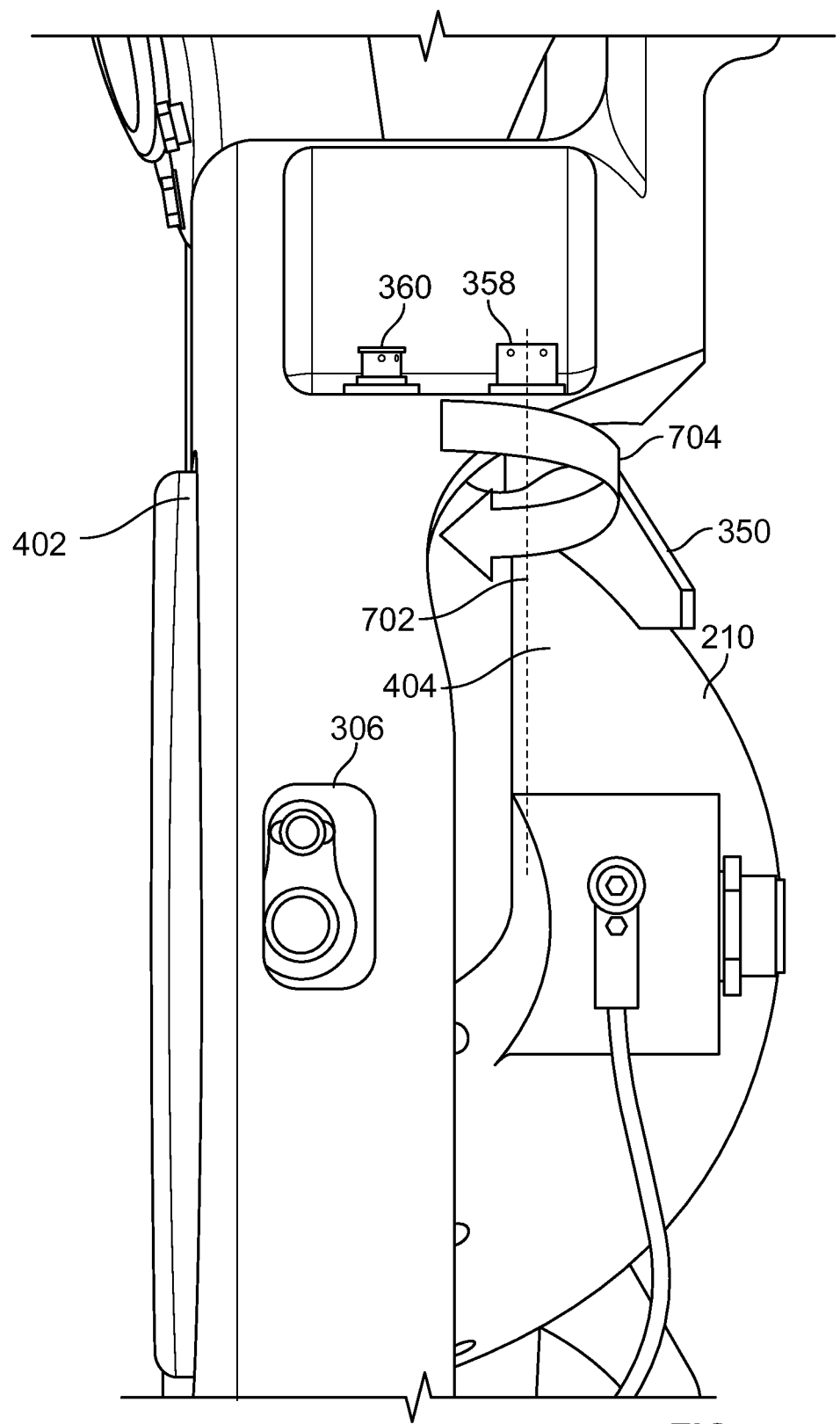
FIG. 7 is a detailed view of a horizontal rotation locking feature of the example adjustable alignment portion of FIG. 4.

FIG. 7 is a detailed view of a horizontal rotation locking feature of the example adjustable alignment portion 400 of FIG. 4. As described above in connection with FIG. 4, the light 210 may rotate in a horizontal direction about the pivot fastener 358 by the pivot fastener 358 passing through the mounting arm 350 and into the slot 408 to engage the clamp 356. As can be seen in the view of FIG. 7, a spherical surface interaction between the mounting arm 350 and the light 210 allows the light 210 to rotate in the horizontal direction about an axis 702 defined by a central axis of the pivot fastener 358 for a total horizontal range of motion of 3.5°, for example, in a direction generally indicated by the arrow 704 or turn in an opposite direction from the arrow 704. However, any appropriate range may be used based on aircraft design, desired illumination and/or application. In this example, the pivot axis 702 is located at the spherical portion 404 of the light 210 for the aforementioned spherical surface interaction and the locking fastener (e.g., set screw) 360 engages the cylindrical portion 402 of the light 210 to constrain the light 210 once the light 210 is properly aligned (e.g., aligned within a tolerance). In this example, the opening 306 is dimensioned appropriately (e.g., wider) to allow access to vertical rotation component(s) throughout the total horizontal range of motion.

Figure 8:
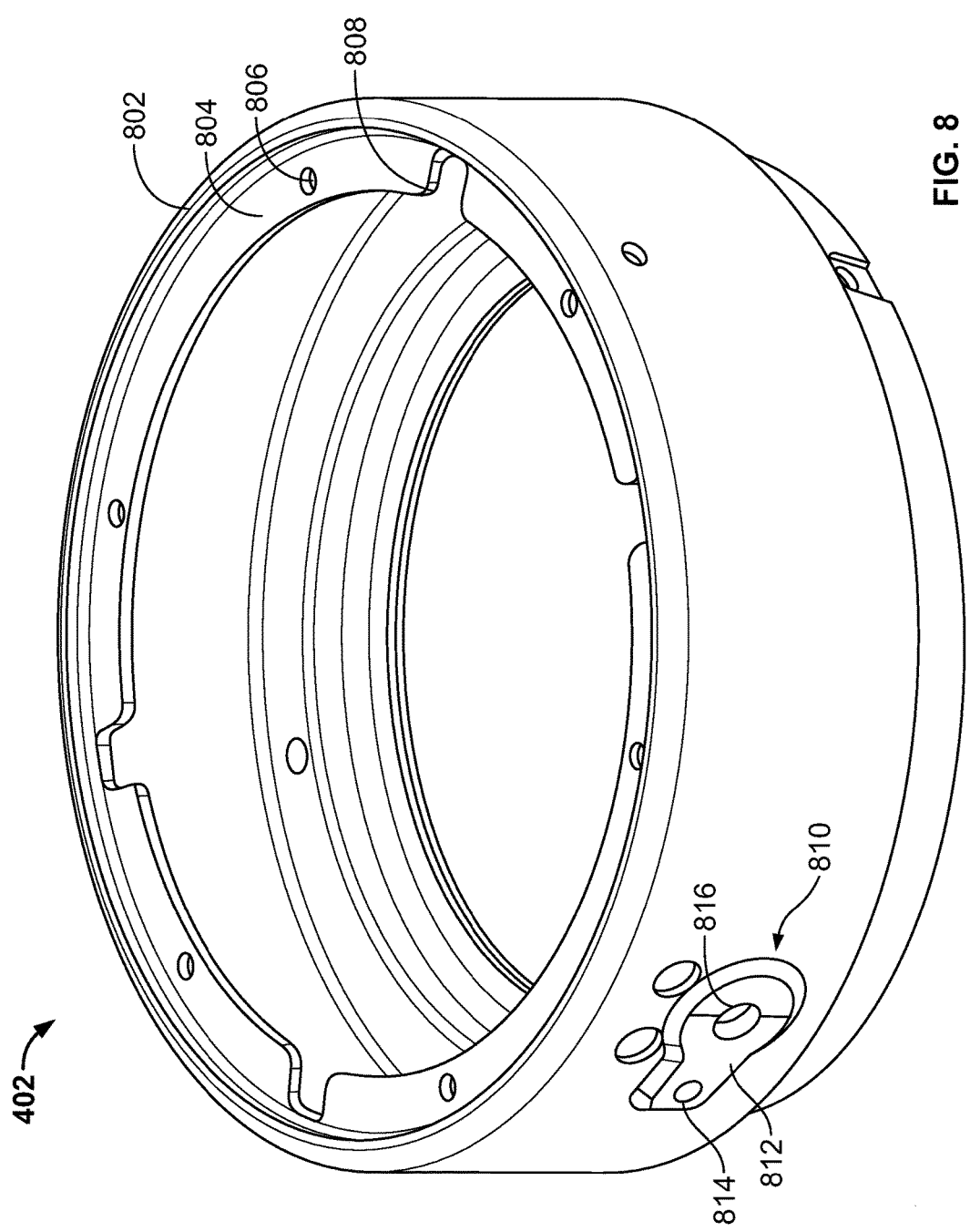
FIG. 8 illustrates an example cylindrical portion of an example light of the example light array of FIG. 2.

FIG. 8 illustrates the example cylindrical portion (e.g., component) 402 of the example housing 502 of the example light 210 of FIG. 2. The cylindrical portion 402 of the illustrated example is used to align the lamp 504, the retainer ring 506 and the light filter 508 shown above in connection with FIG. 5. The example cylindrical portion 402 includes a lip 802, a support rib 804, retainer holes 806, alignment features (e.g., alignment openings, clocking features, etc.) 808, and a mounting protrusion (e.g., an ear) 810, which has a spherical surface 812 in this example. The mounting protrusion 810 includes apertures 814, 816 to receive the fasteners 354, 352, respectively.

In this example, the lip 802 and/or the support rib 804 is used to position the filter 508 and/or any other components within the light 210. Additionally or alternatively, any other components may be pre-assembled to the filter 508 when the filter 508 is positioned within the cylindrical portion 402. The retainer holes 806 of the illustrated example allow fasteners to retain the filter 508 and/or any other components of the light 210. The example mounting protrusion 810 has the spherically shaped surface (e.g., a first spherical surface) 812 to interface (e.g., rest against, move against, contact, not contact, guide by contact, etc.) with a corresponding surface (e.g., a second spherical surface) 902, which is described below in connection with FIG. 9. The spherical interface surfaces 902, 812 between the cylindrical portion 800 and the mounting arm 350, respectively, allow the light 210 to rotate relative to the mounting arm 350 in more than one rotational direction, thereby allowing freely independent rotational movements of the light 210 relative to the mounting arm 350 without use of shims and/or other methods that may require interdependent adjustments (e.g., shimming in one direction may affect the adjustments in another rotational direction).

In this example, the alignment features 808 are cutouts/slots of the support rib 804 and are used to rotationally align one or more components within the light 210 and/or allow a manufacturing alignment tool (e.g., an alignment laser) to be positioned within the light 210 to pre-align portions of the light 210 (e.g., a partially assembled light 210) before the lamp 504 and/or other internal component is assembled to (e.g., within) the light 210.

Figure 9:
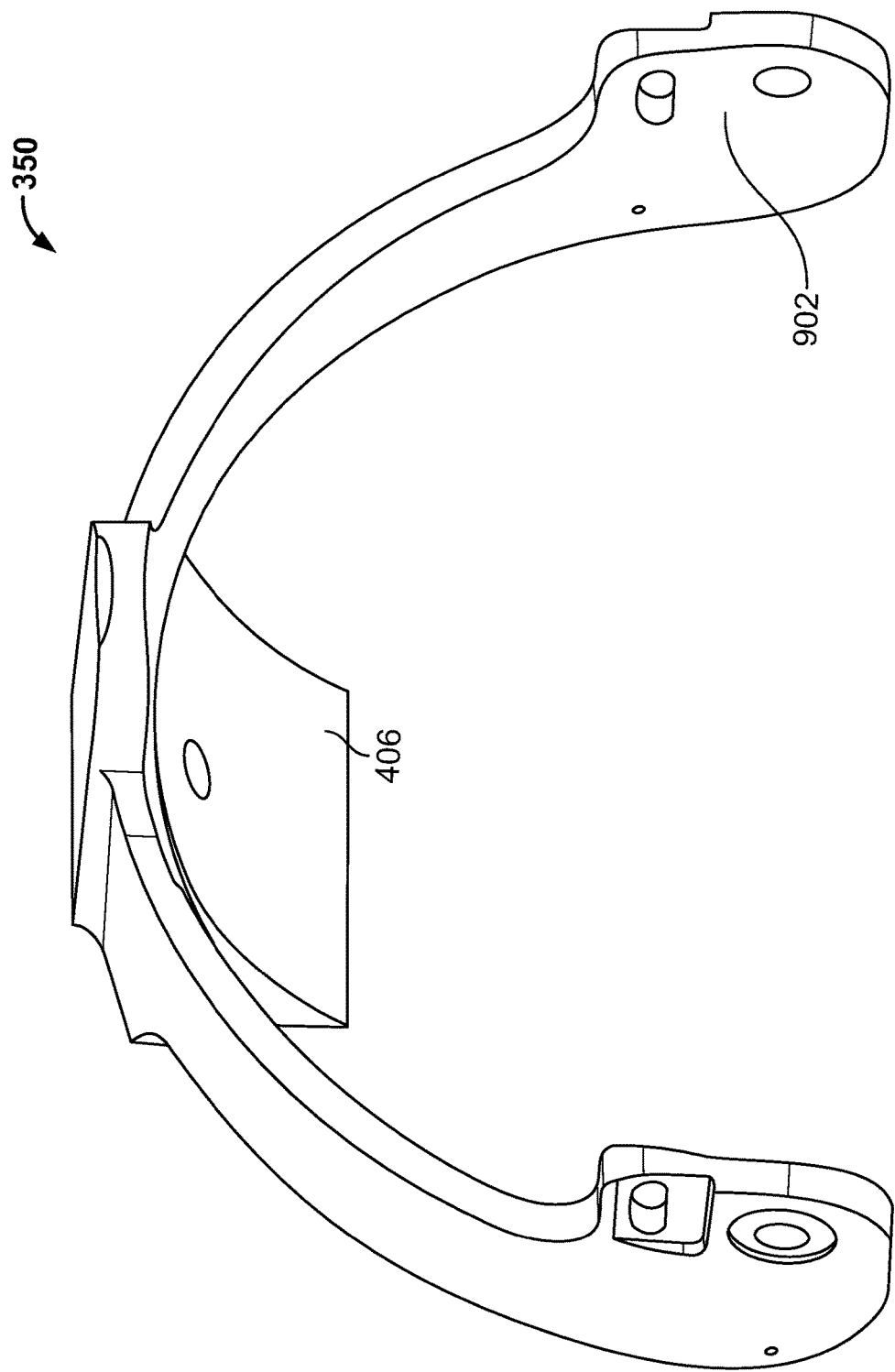
FIG. 9 Illustrates an example mounting arm of the example adjustable alignment portion of FIG. 4.

FIG. 9 illustrates the example mounting arm 350 of the adjustable alignment portion 400 of FIG. 4. The example mounting arm includes the aforementioned spherical surfaces 406, 902 to engage the spherical surfaces 404, 812, respectively, of the light 210 to enable the light 210 to freely rotate about at least two independent axes without overconstraining the light 210. By allowing independent adjustments about the rotational axes, the examples disclosed herein avoid difficult and/or laborious adjustments due to adjustments in other examples that are not fully independent of one another (e.g., shimming operations). Engagement of these surfaces may involve clearances that allow the light 210 to rotate independent of the mounting arm 350. In other examples, engagement of these surfaces may involve surface contact where the complementary surfaces (e.g., substantially similar curvatures, etc.) of one or more spherical interfaces guide the multi-axial rotation of the light 210 relative to the mounting arm 350.

Figure 10:
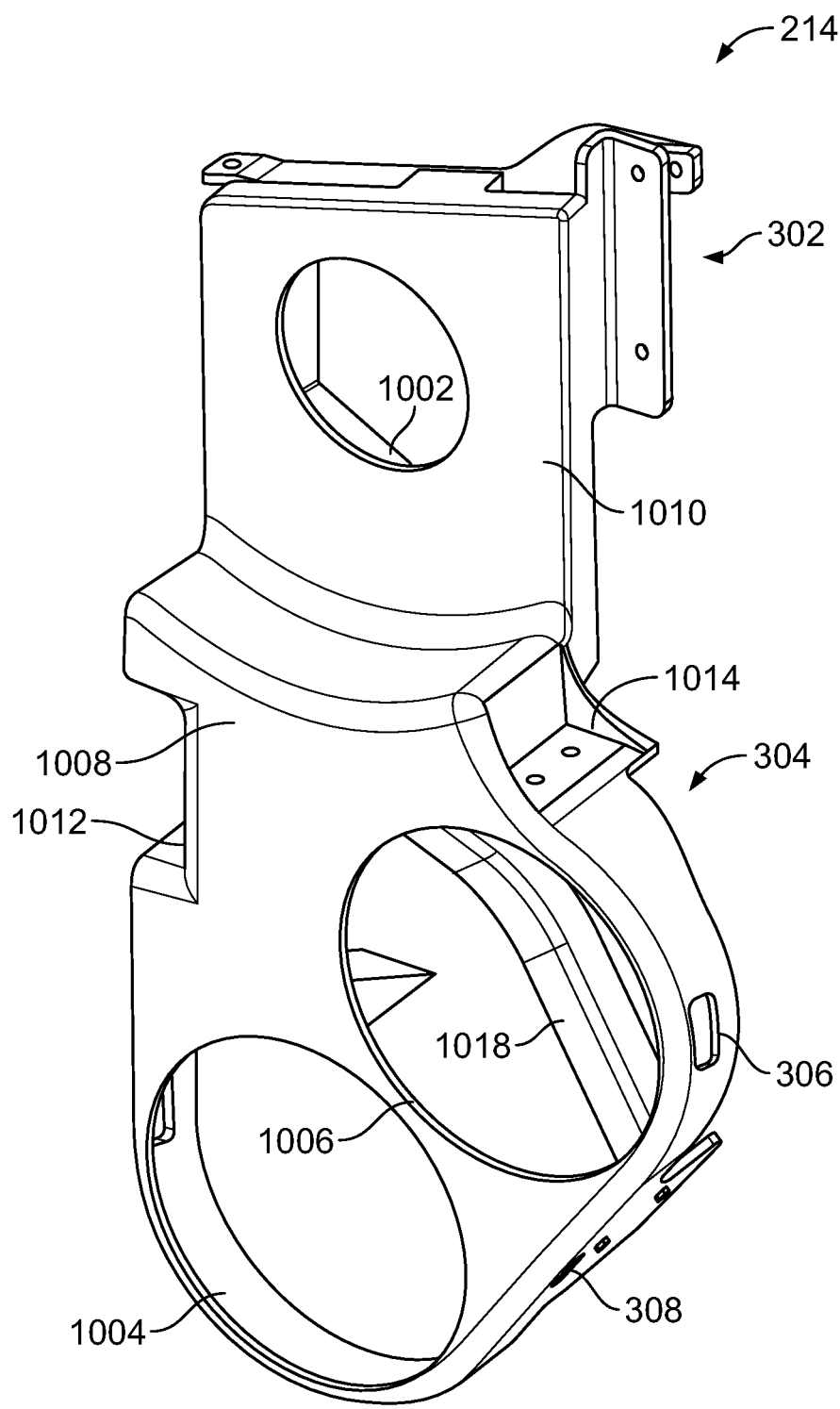
FIG. 10 illustrates an example mounting bracket of the example light array of FIG. 2.

FIG. 10 illustrates the example mounting bracket 214 of the example light array 202 of FIG. 2. In this example, the first portion 302 includes an aperture 1002 to receive the second landing light 212. The second portion 304 of the illustrated example includes apertures 1004, 1006 to receive the lights 208, 210, respectively. In this example, a surface 1008 of the second portion 304 is at an angle (e.g., an angle of 1.5-5°) relative to a surface 1010 of the first portion 302 to create a predefined angular relationship (e.g., a default angular offset) between one or more of the lights 208, 210, 212. In this example the second portion 304 includes access areas (e.g., access-friendly zones, mounting flanges, etc.) 1012, 1014 for horizontal angle adjustments for the lights 208, 210, respectively, that facilitate ease of accessibility to the fasteners 358, 360.

In this example, the mounting bracket 214 includes the openings 306, 308 to allow adjustment of vertical angles of the lights 210, 208, respectively. In some examples, the mounting bracket 214 includes and/or is attached to a support bracing 1018, which may or may not be integral with the mounting bracket 214 for structural support.

Figure 11:
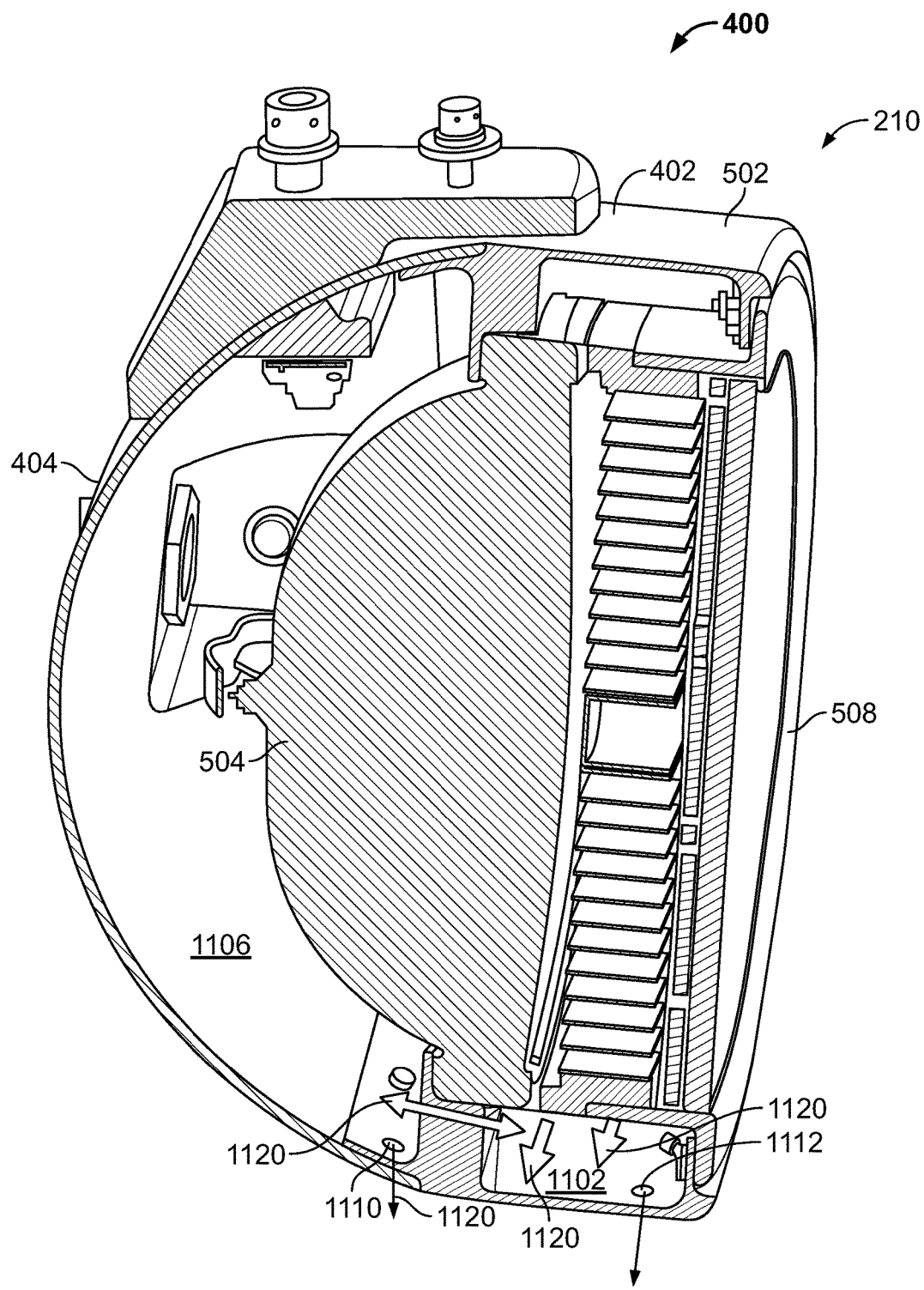
FIG. 11 is a cross-sectional view of the example adjustable alignment portion of FIG. 4.

FIG. 11 is a cross-sectional view of the adjustable alignment portion 400 of the example light array 202. In this example, the cylindrical portion 402 of the housing 502 defines an annular gap 1102 around the filter and at least a portion of the lamp 504. Similarly, the spherical portion 404 of the light 210 defines an annular gap 1106 between the housing 502 and the lamp 504. In this example, the spherical portion 404 also includes exhaust holes 1110. Additionally, the housing 502 of the illustrated example includes exhaust holes 1112 proximate the filter 508 and/or the lamp 504.

In operation, the exhaust holes 1110, 1112 of the illustrated example facilitate cooling of components within the light 210 and also allow excess moisture to be removed from the light 210. In this example, the geometry of the spherical portion 404 allows significant cooling of at least the lamp 504. Heat fluxes (e.g., heat flow) through and out of the light 210 are generally indicated by arrows 1120. The annular clearances of the annular gaps 1102, 1106 of the examples disclosed herein facilitate cooling of internal components by effectively directing/routing the heat towards the exhaust holes 1110, 1112 and/or conducting heat throughout the light 210, thereby increasing the life of the internal components of the light 210.

Figure 12:
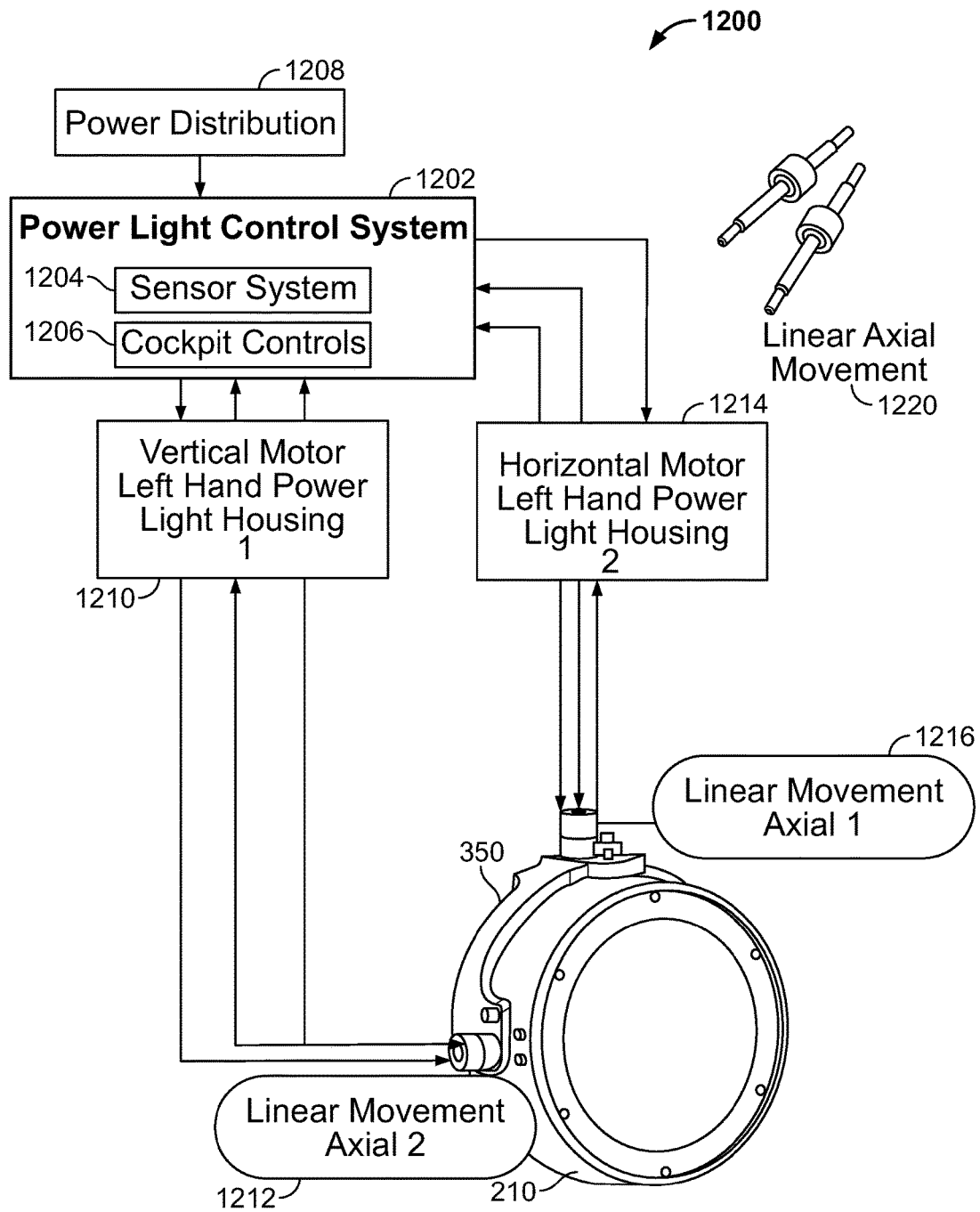
FIG. 12 is a schematic representation of an example actuation system that may be implemented with the example adjustable alignment portion of FIG. 4.

FIG. 12 is a schematic representation of an example actuation system 1200 that may be implemented with the example adjustable alignment portion 400 of FIG. 4. The example actuation system 1200 includes a power light control system 1202, which has a sensor system interface 1204 and a cockpit control interface 1206, a power distribution module 1208, a vertical rotational motor 1210 to control an axial rotation node 1212, and a horizontal rotational motor 1214 to control an axial rotation node 1216. The system includes linear axial movement transducers (e.g., movement cables) 1220 between the motors 1210, 1214 and the axial rotation nodes 1212, 1216, respectively. For example, movement of the linear axial movement transducers 1220, which may be driven in respective pairs, are controlled/displaced by the motors 1210, 1214 to control/direct rotation of the light 210 in the vertical and horizontal directions, respectively.

In operation, the power distribution system module 1208 provides power to the power light control system 1202, which, in turn, provides power to the motors 1210, 1214. In some examples, the power distribution system module 1208 and/or the power light control system 1202 control an amount of power provided to the light 210, thereby allowing variation of illumination provided by the light 210. The power light control system 1202 directs the motors 1210, 1214 to rotate the light 210 relative to the mounting arm 350. In some examples, sensor data from the sensory system interface 1204 is used to define at least one rotational position of the light 210. In some examples, the sensor data may be determined from flight data (e.g., aircraft speed, light conditions, etc.) or sensor data pertaining to a current rotational position of the light 210 relative to the aircraft 100, an orientation of the aircraft 100 and/or other components of the aircraft 100.

Additionally or alternatively, desired rotational positions about one or more rotational axes are determined based on cockpit controls via the cockpit interface 1206. For example, a pilot in a cockpit may utilize the cockpit control interface 1206 to control at least one orientation of the light 210 from the cockpit via manual controls to rotate the light 210 via one or more actuators (e.g., the pilot manually controls rotational orientation(s) of one or more lights on the landing gear) such as the motors 1210, 1214 to increase and/or adjust illumination over a wide variety of different conditions.

While linear actuation is shown in the example of FIG. 12, any appropriate type of actuation may be used. For example, the motors 1210, 1214 may instead drive pinions that turn gears to rotate the axial rotation nodes 1212, 1216. In some examples, a single motor and a gearing/clutch system may be used to rotate the axial rotation nodes 1212, 1216.

Figure 14:
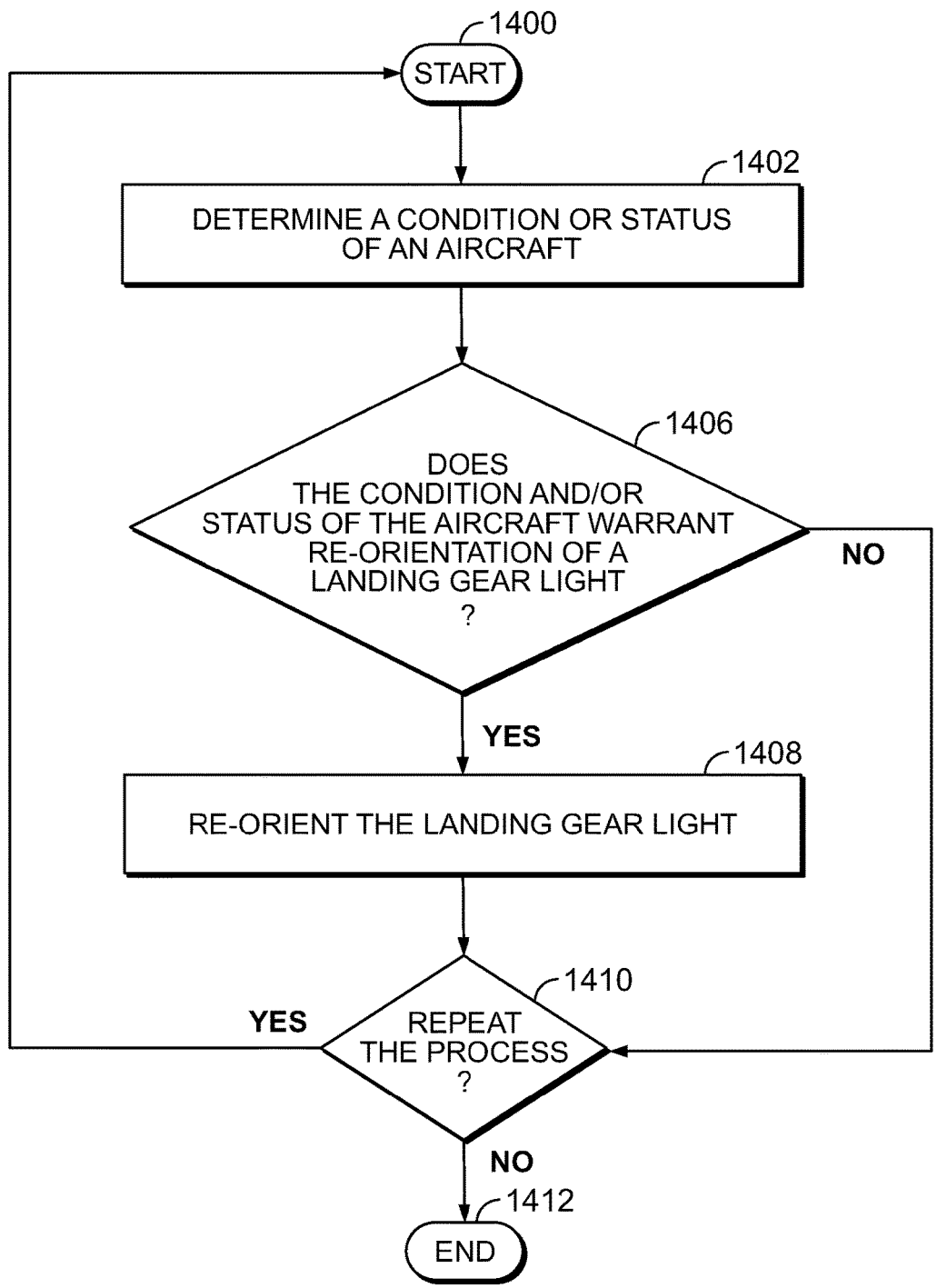
FIG. 14 is a flowchart representative of an example method that may be used to implement the example actuation system of FIG. 12.

While an example manner of implementing the example actuation system 1200 of FIG. 12 is illustrated in FIG. 14, one or more of the elements, processes and/or devices illustrated in FIG. 14 may be combined, divided, re-arranged, omitted, eliminated and/or implemented in any other way. Further, the example power light control system 1202, the example sensor system interface 1204, the example cockpit control interface 1206, the example power distribution module 1208, the example vertical rotational motor 1210, the example horizontal rotational motor 1214 and/or, more generally, the example actuation system 1200 of FIG. 12 may be implemented by hardware, software, firmware and/or any combination of hardware, software and/or firmware. Thus, for example, any of the example power light control system 1202, the example sensor system interface 1204, the example cockpit control interface 1206, the example power distribution module 1208, the example vertical rotational motor 1210, the example horizontal rotational motor 1214 and/or, more generally, the example actuation system 1200 of FIG. 12 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, power light control system 1202, the example sensor system interface 1204, the example cockpit control interface 1206, the example power distribution module 1208, the example vertical rotational motor 1210, and/or the example horizontal rotational motor 1214 is/are hereby expressly defined to include a tangible computer readable storage device or storage disk such as a memory, a compact disk (CD), etc. storing the software and/or firmware. Further still, the example the example actuation system 1200 of FIG. 12 may include one or more elements, processes and/or devices in addition to, or instead of, those illustrated in FIG. 14, and/or may include more than one of any or all of the illustrated elements, processes and devices.

Figure 13:
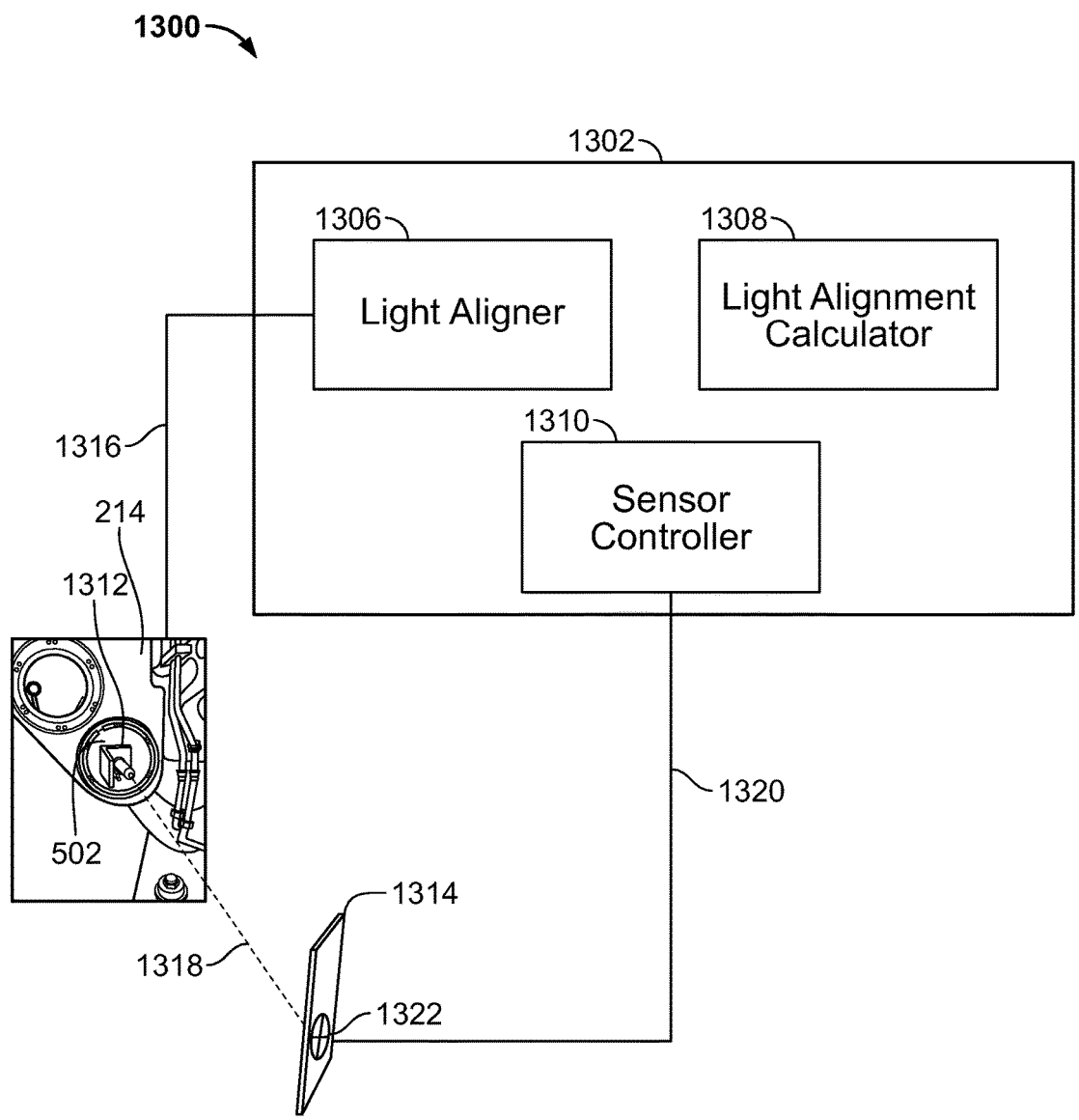
FIG. 13 is a schematic representation of an example light alignment system that may be used to orient the light of the example adjustable alignment portion of FIG. 4.

FIG. 13 is a schematic representation of an example light alignment system 1300 that may be used to align the light 210 of the example adjustable alignment portion 400 of FIG. 4. In some examples, the light alignment system 1300 is used to align a replacement light during a use conversion (e.g., a conversion from commercial to military use). Alternatively, in some examples, the light alignment system 1300 is used to align an add-on assembly (e.g., an IR light assembly). The example light alignment system includes a targeting system 1302, which includes a light aligner 1306, a light alignment calculator 1308 and a sensor controller 1310. The light alignment system 1300 also includes a laser source 1312, which may be temporarily mounted to the light 210 for alignment purposes, and a target 1314 (e.g., a sensing target). The light aligner 1306 of the illustrated example is communicatively coupled to the laser source 1312 via a communication line 1316 and, in some examples, an actuation system (e.g., the example actuation system 1200) that adjusts directional rotation(s) of the housing 502 of the light 210 that is retained by the mounting bracket 214. In this example, the sensing target 1314 is communicatively coupled to the sensor controller 1310 via a communication line 1320.

In this example, the laser source 1312 directs a light beam 1318 towards the target 1314. The laser source 1312 of the illustrated example is positioned within the housing 502 via the alignment features 808 and/or the support rib 804 of the cylindrical portion 800 of FIG. 8, for example. The example sensor controller 1310 determines a degree to which the light beam 1318 is misaligned relative to a target reticle 1322 of the target 1314. In this example, the sensor controller 1310 conveys a position (e.g., a delta) of where the beam 1318 strikes the target 1314 relative to the target reticle 1322 and/or the position of where the beam 1318 hits the target 1314 to the light alignment calculator 1308 which, in turn, calculates a corresponding re-orientation and/or angular shift(s) of the housing 502 so that the laser beam 1318 is aligned with the target reticle 1322 within a defined tolerance. The light alignment calculator 1308 then conveys the calculated orientation information to the light aligner 1306, which indicates a degree to which the housing 502 is to be rotated (e.g., rotated in multiple axes) so that the beam 1318 from the laser source 1312 is aligned with the target reticle 1322.

In some examples, the light aligner 1306 directs one or more actuators to rotate the housing 502 so that the beam 1318 hits (i.e., is aligned with) the target reticle 1322. Alternatively, the housing 502 may be manually moved (e.g., moved by an operator) so that the beam 1318 hits the target reticle 1322 within the defined tolerance. Once the beam 1318 from the housing 502 is in the proper orientation, as indicated by the beam 1318 relative to the target reticle 1322, both horizontal/vertical rotational locks of the adjustable alignment portion 400 may be sequentially engaged (e.g., constrained, in a constraining mode, locked into place, pivots locked, etc.), for example. In some examples, the vertical rotation is locked first and then the horizontal rotation is locked and in other examples, the locking sequence may be reversed. In some examples, the vertical and horizontal rotations are locked into place at relatively short time intervals (e.g., simultaneously) relative to one another. Alternatively, both the vertical rotation and horizontal rotation are locked by torquing down fasteners in an alternate matter (e.g., incrementally torquing down locking mechanisms in an alternating fashion).

Figure 15:
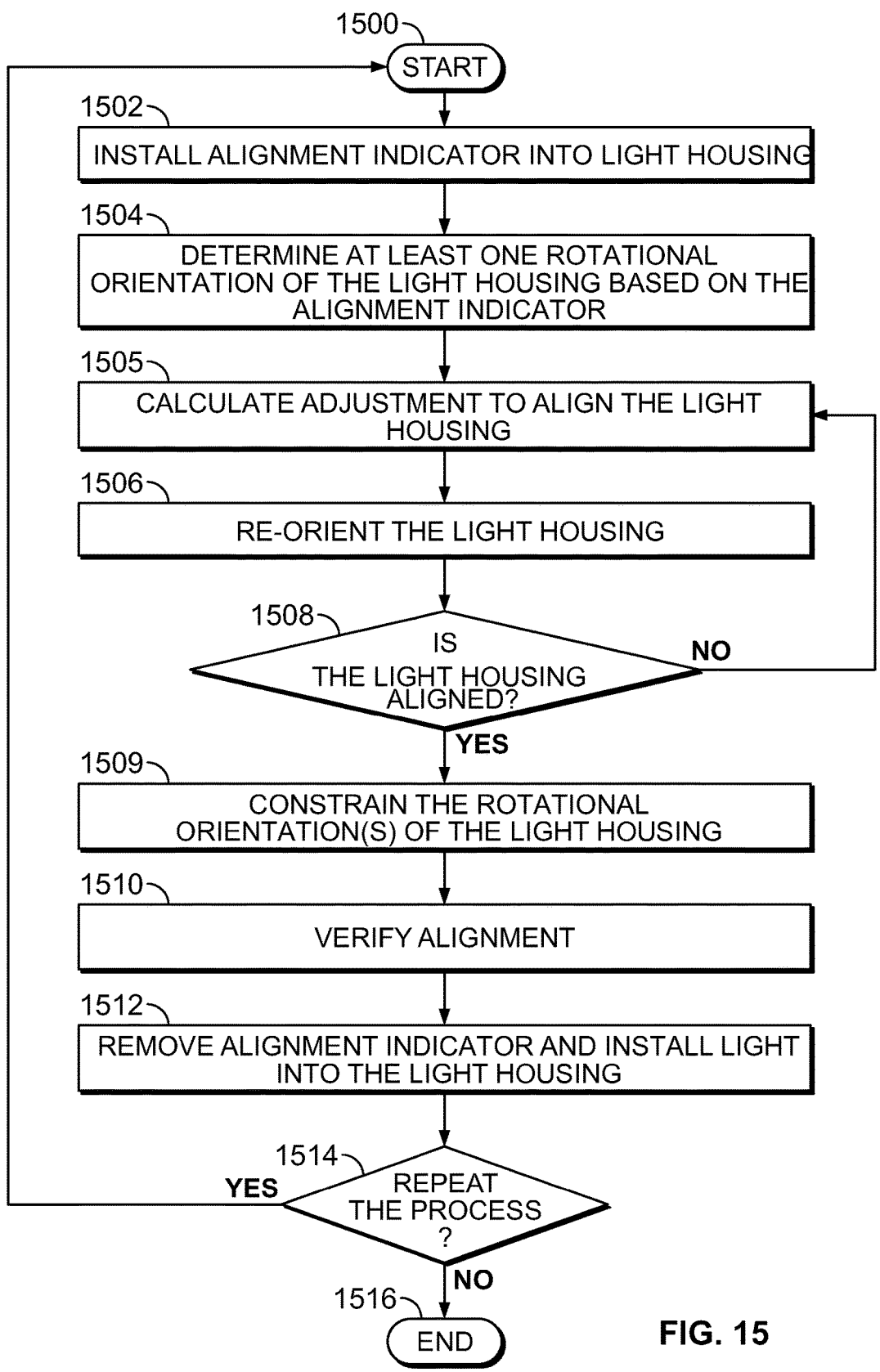
FIG. 15 is a flowchart representative of an example method that may be used to implement the example light alignment system of FIG. 13.

While an example manner of implementing the example light alignment system 1300 is illustrated in FIG. 15, one or more of the elements, processes and/or devices illustrated in FIG. 15 may be combined, divided, re-arranged, omitted, eliminated and/or implemented in any other way. Further, the example targeting system 1302, the example light aligner 1306, the example light alignment calculator 1308, the example sensor controller 1310, the example laser source 1312, the example sensing target 1314 and/or, more generally, the example light alignment system 1300 of FIG. 13 may be implemented by hardware, software, firmware and/or any combination of hardware, software and/or firmware. Thus, for example, any of the example targeting system 1302, the example light aligner 1306, the example light alignment calculator 1308, the example sensor controller 1310, the example laser source 1312, the example sensing target 1314 and/or, more generally, the example light alignment system 1300 of FIG. 13 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, targeting system 1302, the example light aligner 1306, the example light alignment calculator 1308, the example sensor controller 1310, the example laser source 1312, and/or the example sensing target 1314 is/are hereby expressly defined to include a tangible computer readable storage device or storage disk such as a memory, a compact disk (CD), etc. storing the software and/or firmware. Further still, the example light alignment system 1300 of FIG. 13 may include one or more elements, processes and/or devices in addition to, or instead of, those illustrated in FIG. 15, and/or may include more than one of any or all of the illustrated elements, processes and devices.

Flowcharts representative of example methods for implementing the example actuation system 1200 of FIG. 12 and the example light alignment system 1300 of FIG. 13 are shown in FIGS. 14 and 15. In this example, the methods of FIGS. 14 and 15 may be implemented using instructions that comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 14 and 15, many other methods of implementing the example actuation system 1200 and the example light alignment system 1300 may alternatively be used. For example, the order of execution of the blocks may be changed, and/or some of the blocks described may be changed, eliminated, or combined.

As mentioned above, the example methods of FIGS. 14 and 15 may be implemented using coded instructions (e.g., computer and/or machine readable instructions) stored on a tangible computer readable storage medium such as a hard disk drive, a flash memory, a read-only memory (ROM), a compact disk (CD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 14 and 15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 14 begins at block 1400 where an aircraft with a landing gear light (e.g., the light 210) is in a scenario where illumination of a runway may be required (e.g., a low light condition, night, etc.) (block 1400). A condition or status of the aircraft is determined (block 1402). In some examples, the status may be a control status, which may pertain to a command (e.g., a command to re-orient) related to orientation of the landing gear light. In some examples, the status may be based on a mode of the aircraft (e.g., landing, taxiing, landing gear deployment, etc.). Additionally or alternatively, this status may also be indicated by configuration settings (e.g., taxiing settings/modes, etc.) that are being used. The status may be determined by sensor data from a sensor system interface such as the sensor system interface 1204. Additionally or alternatively, the status may be determined by a cockpit controls interface such as the cockpit control interface 1206.

Next, it is determined whether the condition and/or the status of the aircraft requires/warrants re-orientation of the landing gear light (block 1406). For example, a value (e.g., an amount of exterior light detected) exceeding a threshold (e.g., a light sensor) may make such a determination. If it is determined that the landing gear light will need to be re-oriented (block 1406), the landing gear light is re-oriented by an actuation system (e.g., the example actuation system 1200), for example (block 1408). In particular, the landing gear light of the illustrated example may be re-oriented by rotation of at least one of two rotational axes via linear axial movement transducers such as the linear axial movement transducers 1220 of FIG. 12. In some examples, positional sensors are used to verify that the landing gear light has been properly oriented. Once the landing gear light has been re-oriented (block 1408), control of the process returns to block 1410. If the condition and/or status of the aircraft does not warrant re-orientation of the landing gear light (block 1406), the landing gear light is not re-oriented and control of the process proceeds to block 1410.

It is then determined whether to repeat the method (block 1410). If the process is to be repeated, the process returns to block 1400. If the method is not to be repeated, the method ends (block 1412). The determination of whether to repeat the method may result from determining whether a status of the aircraft has changed and/or is anticipated to change.

The example method of FIG. 15 begins at block 1500 where a partial assembly of a light array (e.g., an assembly with a housing and mounting arm, but lacking other internal lighting components) has been placed on an aircraft. In this example, a light housing (e.g., the housing 502) has been assembled with a light fixture (e.g., the mounting arm 350), both of which have been assembled onto the aircraft without a lamp (e.g., the lamp 504) in the housing so that an alignment indicator, which is a laser source (e.g., the laser source 1312) in this example, may be mounted into/within the housing. This mounting of the alignment indicator into the housing prior to assembling the lamp/light facilitates alignment of the light housing relative to a specified angular tolerance range so that the lamp may be later placed within the light housing after the light housing has been properly aligned (e.g., within a defined tolerance).

The alignment indicator is installed into the light (block 1502). Next, at least one rotational orientation of the light housing is determined based on the alignment indicator (block 1504). For example, the alignment indicator may be directed towards a target reticle (e.g., the target reticle 1322). The orientation of the light housing may be determined based on how far the beam is from the target reticle.

Next, a light alignment calculator such as the light alignment calculator 1308 of FIG. 13 is used to calculate an angular adjustment to align the light housing (block 1505). For example, the light alignment calculator may use spatial/geometric calculations to determine a degree to which the light housing is to be re-oriented to be properly aligned. The light housing is then re-oriented based on the calculated adjustment (block 1506).

In some examples, it is then determined whether the light housing is aligned (block 1508). Such a determination may be based on whether the beam emitted from the alignment indicator hits (e.g., is aligned with) the target reticle that has been placed in a pre-defined location relative to the aircraft. In some examples, the target is placed on a tripod, which is discussed in greater detail below in connection with FIG. 17. If the example light housing is not properly aligned (block 1508), the method returns control to block 1505. However, if the light housing is properly aligned (e.g., verified to be within a specified tolerance of the reticle) (block 1508), the light housing is constrained in its rotational orientation(s) (e.g., constrained at multiple pivots) (block 1509). For example, locking fasteners (e.g., set screws) may be tightened/torqued to constrain (e.g., tighten, lock, etc.) the light housing in both horizontal and vertical directions to prevent further rotational motion of the light housing relative to the aircraft. In some examples, the alignment of the light housing is verified after the light housing has been constrained to verify that the light housing did not significantly displace during the constraining/tightening process (block 1510). For example, although the light housing has been determined to be aligned, further alignment verification may occur via the target reticle.

Because the light housing has been aligned and/or verified to be aligned, the alignment indicator is removed and a light is installed into the light housing (block 1512). Next, it is determined if the method is to be repeated (block 1514). If the method is to be repeated (block 1514), control of the method returns to block 1500. If the method is not to be repeated (block 1514), the methods ends (block 1516).

Figure 16:
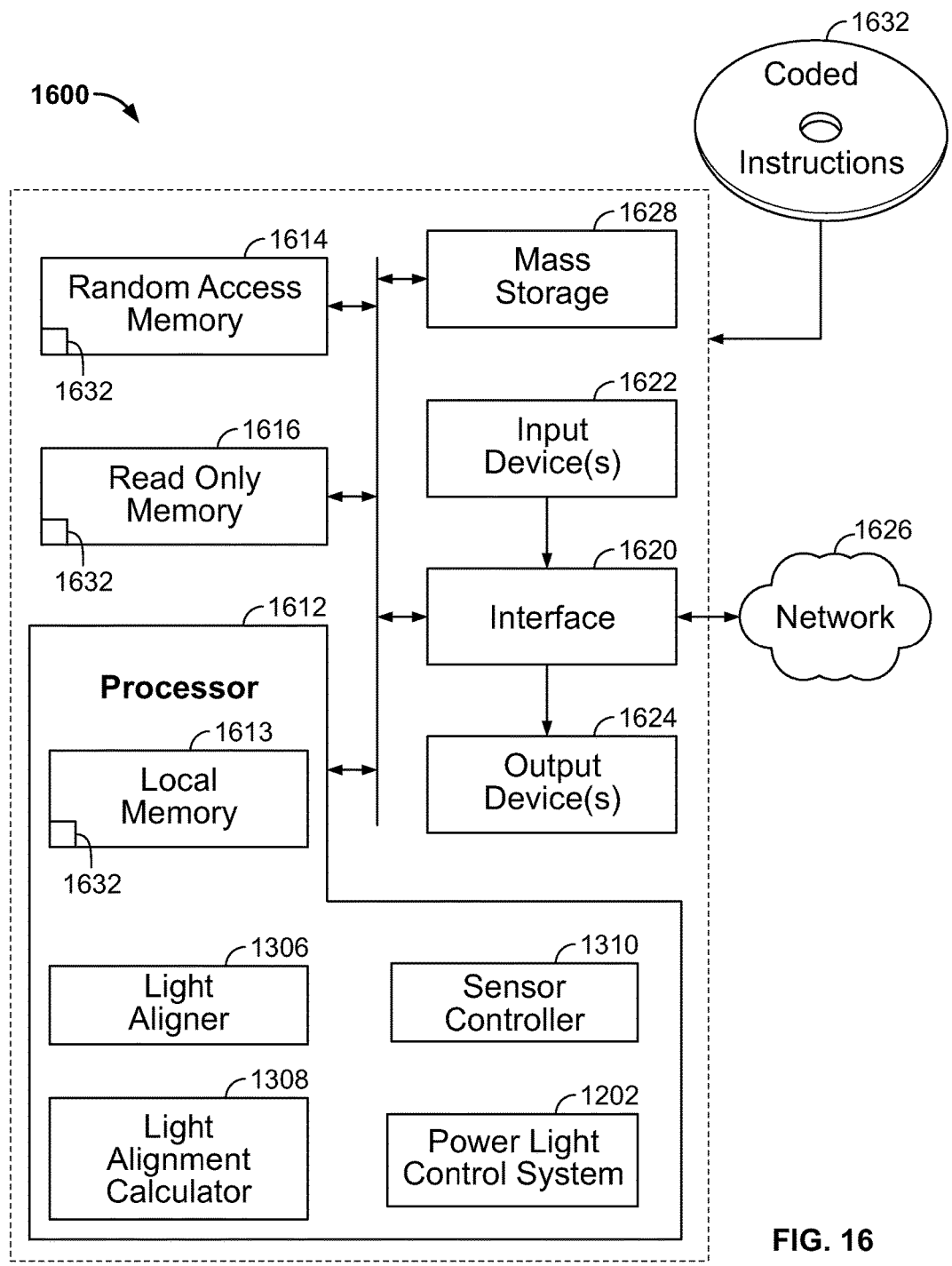
FIG. 16 is a block diagram of an example processor platform capable of executing machine readable instructions to implement the example methods of FIGS. 14 and 15.

FIG. 16 is a block diagram of an example processor platform 1600 to implement the methods of FIGS. 14 and 15 to implement the example actuation system 1200 and/or the example light alignment system 1300 of FIGS. 12, 13. The processor platform 1600 can be, for example, a server, a 1553 aircraft data bus device, a personal computer or any other type of computing device.

The processor platform 1600 of the illustrated example includes a processor 1012. In this example, the processor 1612 includes the example light aligner 1306, the example light alignment calculator 1308, the example sensor controller 1310 and the example power light control system 1202. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, coaxial cable, etc.).

The processor platform 1600 of the illustrated example also includes one or more mass storage devices 1628 for storing software and/or data. Examples of such mass storage devices 1628 include floppy disk drives, hard drive disks, 1553 databus devices compact disk drives, and RAID systems.

Coded instructions 1632 to implement the methods of FIGS. 14 and 15 may be stored in the mass storage device 1628, in the volatile memory 1614, in the non-volatile memory 1616, and/or on a removable tangible computer readable storage medium such as a CD.

Figure 17:
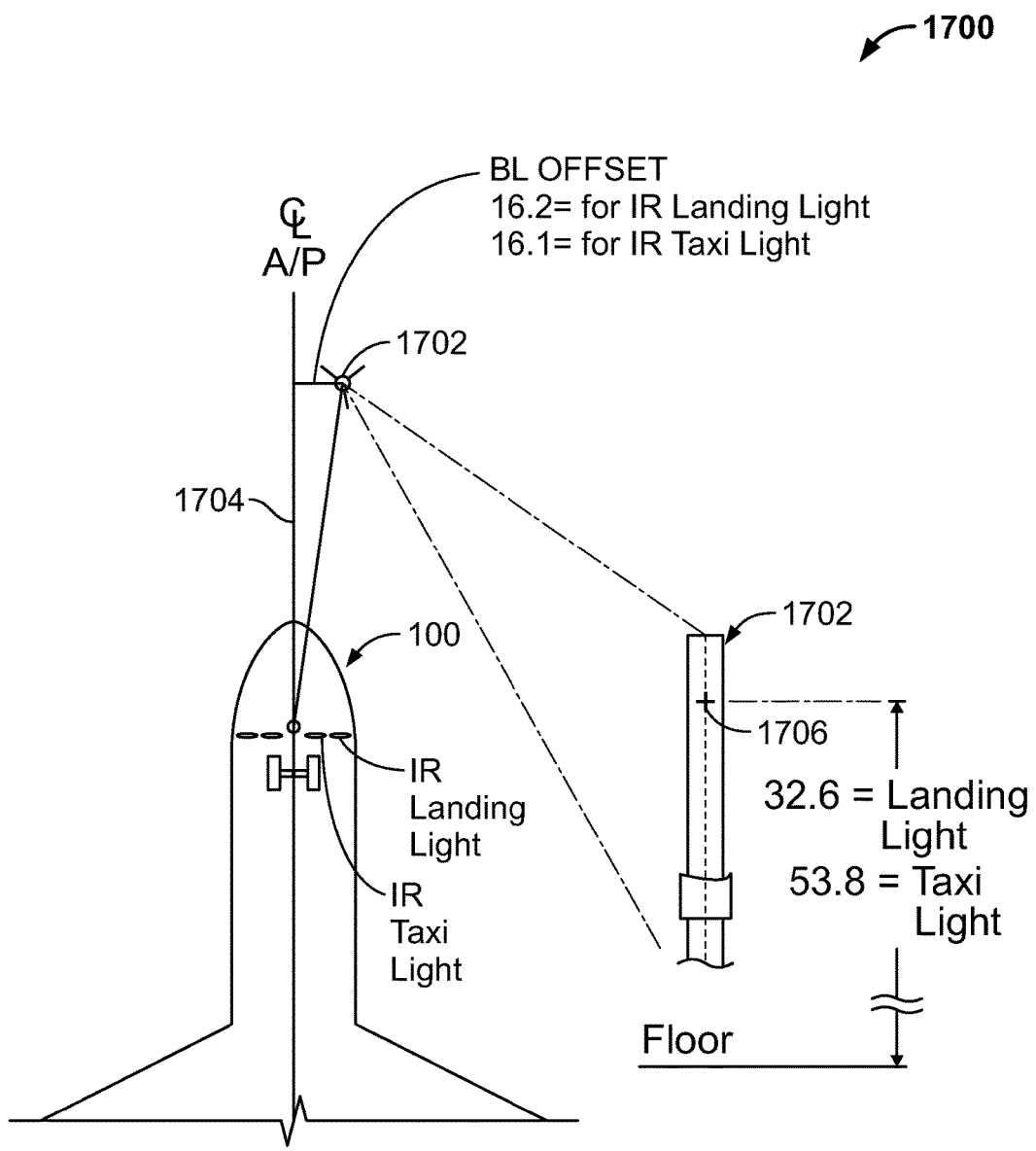
FIG. 17 illustrates an example light alignment system layout that may be used to align the example alignment adjustment portion of FIG. 4.

FIG. 17 illustrates an example light alignment system layout 1700 that may be used to align the example alignment adjustment portion 400 of FIG. 4 using the example method described above in connection with FIG. 15. In this example, a tripod 1702 is placed at a pre-defined distance from a centerline 1704 of the aircraft 100. The tripod 1702 has a target reticle 1706 to act as an indication of an alignment of a light of the aircraft 100. An alignment indicator, which is a laser source in this example, such as the alignment indicator 1312 is aimed after being assembled into a rotatable light housing before rotationally constraining (e.g., torquing down fasteners) the light housing. The example of FIG. 17 shows example dimensions (in inches) for the horizontal offset of the reticle 1706 as well as the height offset of the reticle 1706 from the ground. The dimensions shown are only examples and other dimensions may be used based on aircraft design and/or desired illumination, for example.

From the foregoing, it will appreciate that the above disclosed methods, apparatus and articles of manufacture allow quick and efficient angular adjustment of lights without the use of shims.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft landing gear lights are described, the examples disclosed herein may be applied to projector systems, lighting systems, etc.

What is claimed is:

1. An apparatus comprising:
an aircraft landing gear light fixture having a first spherical portion;
a light assembly coupled to the light fixture, wherein the light assembly includes a second spherical portion adjacent the first spherical portion, the first and second spherical portions having complementary curvature relative to one another such that a distance is maintained therebetween when the first and second spherical portions are moved relative to one another; and
first and second pivots of the light assembly to allow the light assembly to rotate relative to the light fixture, wherein the first pivot is to allow the light assembly to rotate relative to the light fixture about a first axis, wherein the second pivot is to allow the light assembly to rotate relative to the light fixture about a second axis, the first axis different from the second axis, wherein the light assembly is fastened to the light fixture at the first and second pivots, wherein the rotation of the light assembly relative to the light fixture occurs by the first and second spherical portions moving relative to one another, and wherein the light assembly is capable of movement relative to the light fixture along the first and second axes when the light fixture is stationary.

2. The apparatus as defined in claim 1, wherein the the maintained distance is zero.

3. The apparatus as defined in claim 1, further including a lock to prevent rotation of the light assembly about at least one of the first or second axes.

4. The apparatus as defined in claim 3, wherein the lock includes at least one pin or set screw.

5. The apparatus as defined in claim 1, wherein the light assembly further includes a cylindrical portion.

6. The apparatus as defined in claim 1, further including a slot on one or more of the light fixture or the light assembly to guide a pin to constrain a rotational range of the light assembly relative to the light fixture.

7. The apparatus as defined in claim 6, wherein the slot has an arc-shape or a semicircular shape.

8. The apparatus as defined in claim 1, further including:
an actuator to rotate the light assembly; and
a processor to control the actuator to rotate the light assembly relative to the light fixture.

9. The apparatus as defined in claim 8, wherein the processor is communicatively coupled to a sensor interface or a cockpit interface to determine a degree to which the actuator is to rotate the light assembly.

10. An apparatus comprising:
a light fixture having a first spherical portion;
a light assembly having a second spherical portion, wherein the first and second spherical portions define an interface to allow the light assembly to rotate relative to the light fixture, the first and second spherical portions having complementary curvature relative to one another such that a distance is maintained therebetween when the first and second spherical portions are moved relative to one another;
a first pivot of the light assembly to allow the light assembly to rotate about a first axis;
a second pivot of the light assembly to allow the light assembly to rotate about a second axis, the second axis different from the first axis, wherein the light assembly is fastened to the light fixture at the first and second pivots; and
a slot on the light fixture or the light assembly to guide a pin to affect motion of the light assembly relative to the light fixture, and wherein the light assembly is capable of movement relative to the light fixture along the first and second axes when the light fixture is stationary.

11. The apparatus as defined in claim 10, further including a device lock to constrain movement of the light assembly at the first or second pivot.

12. The apparatus as defined in claim 10, further including:
an actuator to rotate the light assembly; and
a processor to control the actuator to rotate the light assembly relative to the light fixture.

13. The apparatus as defined in claim 10, wherein the light assembly further includes a cylindrical portion.

14. The apparatus as defined in claim 10, wherein the light assembly further includes exhaust holes.

15. The apparatus as defined in claim 10, wherein the light fixture is disposed within a mounting bracket and the mounting bracket includes openings to allow access to a pin to guide a rotation of the light assembly, or at least one pivot locking device.

16. A method comprising:
positioning a light alignment indicator within a housing of a light assembly that is assembled to a light fixture, wherein the housing includes a first spherical portion and the light fixture includes a second spherical portion, the first and second spherical portions defining a rotational interface between the housing and the light fixture, the first and second spherical portions having complementary curvature relative to one another such that a distance is maintained therebetween when the first and second spherical portions are moved relative to one another at first and second pivots of the light assembly, wherein the first pivot is to allow the light assembly to rotate relative to the light fixture about a first axis, wherein the second pivot is to allow the light assembly to rotate relative to the light fixture about a second axis, the first axis different from the second axis, wherein the light assembly is fastened to the light fixture at the first and second pivots, and wherein the light assembly is capable of movement relative to the light fixture along the first and second axes when the light fixture is stationary;

rotating the housing relative to the light fixture so that a light beam from the light indicator is aligned with a target; and constraining the light assembly relative to the light fixture when the light beam is aligned with the target.

17. The method of claim 16, wherein the light alignment indicator includes a laser source.

18. The method of claim 16, wherein the light assembly is rotated via an actuator.

19. The method of claim 16, wherein the target includes a reticle mounted located on a tripod.

20. The method of claim 16, wherein constraining the light assembly includes tightening a lock.

* * * * *

UNITED STATES PATENT AND TRADEMARK OFFICE
CERTIFICATE OF CORRECTION

PATENT NO. : 10,150,574 B2
APPLICATION NO. : 14/806393
DATED : December 11, 2018
INVENTOR(S) : Nogales et al.

Page 1 of 1

It is certified that error appears in the above-identified patent and that said Letters Patent is hereby corrected as shown below:

In the Specification

Column 15: Line 61, after the word "the" remove the word --the--.

Signed and Sealed this
Twenty-third Day of April, 2019

Andrei Iancu
*Director of the United States Patent and Trademark Office*